(12) United States Patent
Maeda et al.

(10) Patent No.: US 11,971,309 B2
(45) Date of Patent: Apr. 30, 2024

(54) MEASUREMENT DATA PROCESSING DEVICE

(71) Applicant: JAPAN AEROSPACE EXPLORATION AGENCY, Chofu (JP)

(72) Inventors: Takashi Maeda, Chofu (JP); Naoya Tomii, Chofu (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 943 days.

(21) Appl. No.: 16/932,905

(22) Filed: Jul. 20, 2020

(65) Prior Publication Data

US 2021/0223116 A1 Jul. 22, 2021

(30) Foreign Application Priority Data

Jan. 20, 2020 (JP) .................................. 2020-006799
Apr. 16, 2020 (JP) .................................. 2020-073417

(51) Int. Cl.
*G01K 11/00* (2006.01)
*G01N 22/00* (2006.01)

(52) U.S. Cl.
CPC ........... *G01K 11/006* (2013.01); *G01N 22/00* (2013.01)

(58) Field of Classification Search
CPC .............................. G01K 11/006; G01N 22/00
USPC ........................................................ 342/351
See application file for complete search history.

(56) References Cited

U.S. PATENT DOCUMENTS 5,053,781 A * 10/1991 Milman ................... G01V 3/17
374/E11.003
5,724,044 A * 3/1998 Tanaka ................. H01Q 21/061
342/371

FOREIGN PATENT DOCUMENTS

JP  H07-209359 A  8/1995

OTHER PUBLICATIONS

"Space Use Water Circulation Fluctuation Observation Satellite "Shizuku" by an Artificial Satellite" (GCOM-W) Internet <http://www.jaxa.jp/projects/sat/gcom_w/>.

(Continued)

*Primary Examiner* — Cassi J Galt
(74) *Attorney, Agent, or Firm* — Oliff PLC

(57) ABSTRACT

A system includes an antenna having a predetermined directivity and a measurement data processing device that modifies spatial resolution of measurement data received from the antenna. The device includes a plurality of multipliers that multiply together measurement values, which are the signal intensity of the microwave output by the microwave radiometer, and weighting coefficients to be an element of a weighted vector a and output multiplication results; and an integrator that integrates the multiplication results of the plurality of multipliers. The weighted vector a modifies the accuracy of the corrected sensitivity function $\Phi(x,y)$ with performance of the arithmetic processing of the inverse problem in order to reduce integrated values of a positive value region and a negative value region present on an outer side of the sensitivity distribution of the target antenna sensitivity distribution function $F(x,y)$ in the corrected sensitivity function $\Phi(x,y)$.

1 Claim, 17 Drawing Sheets

(56) References Cited

OTHER PUBLICATIONS

Maeda, T. et al., "GCOM-W1 AMSR2 Level 1R Product: Dataset of Brightness Temperature Modified Using the Antenna Pattern Matching Technique," IEEE Trans. on Geoscience and Remote Sensing, 54, 2, 770-782, 2016. Internet <https://ieeexplore.ieee.org/stamp/stamp.jsp?tp=&arnumber=7244183>.
David G. Long et al., "Spatial Resolution Enhancement of SSM/I Data," IEEE Transactions on Geoscience and Remote Sensing, vol. 36, No. 2, pp. 407-417, 1998.
Mar. 24, 2020 Office Action issued in Japanese Patent Application No. 2020-006799.

* cited by examiner

| 301 MEASUREMENT DATA TABLE |
|---|
| DATE AND TIME |
| SERIAL NUMBER |
| FREQUENCY BAND |
| MEASUREMENT VALUE |

| 302 WEIGHTED VECTOR TABLE |
|---|
| CENTER SERIAL NUMBER |
| OPERATION TARGET POSITION |
| FREQUENCY BAND |
| COEFFICIENT |

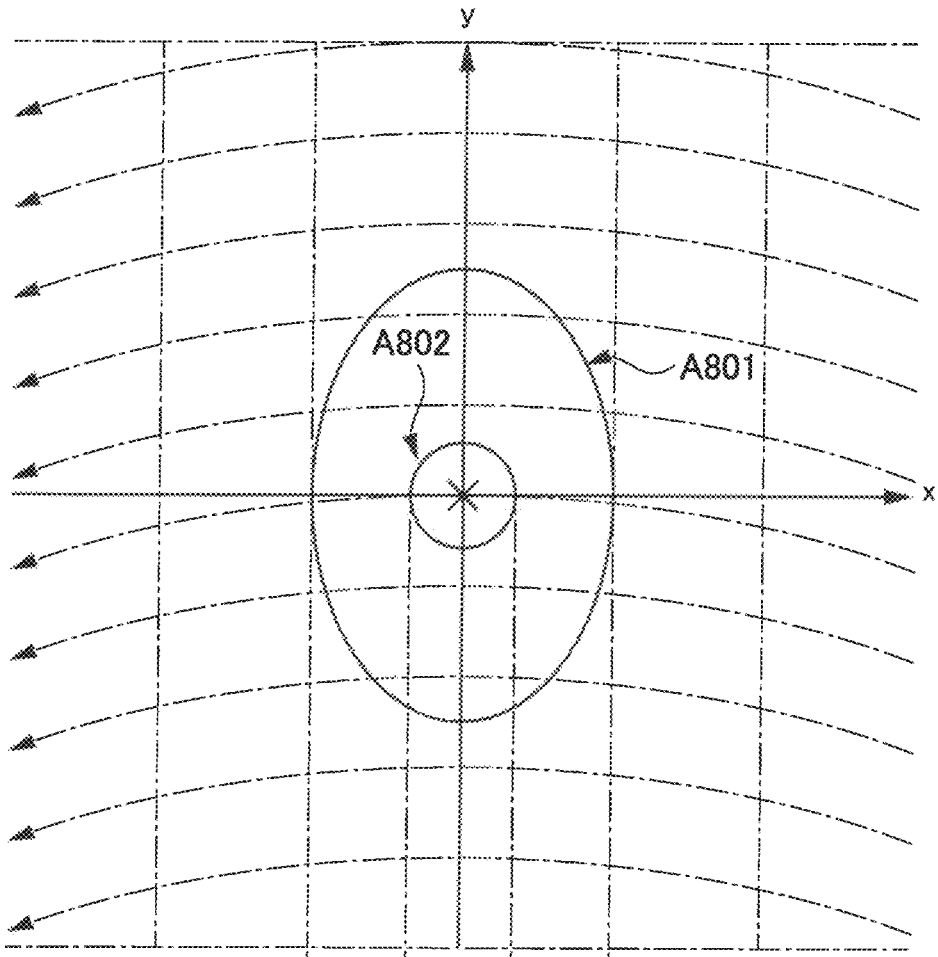
FIG. 8
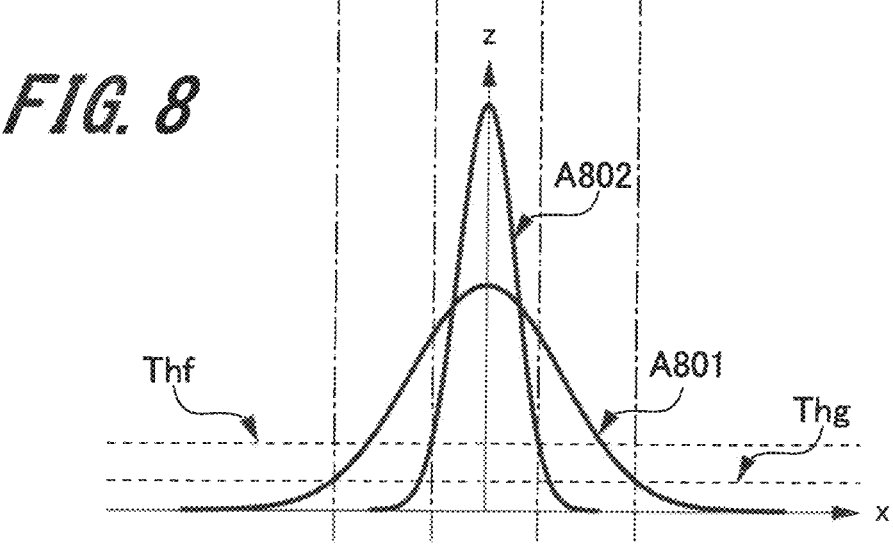

| $G_{24}$ | $G_{25}$ | $G_{26}$ |
|---|---|---|
| $G_{21}$ | $G_{22}$ | $G_{23}$ |
| $G_{18}$ | $G_{19}$ | $G_{20}$ |
| $G_{15}$ | $G_{16}$ | $G_{17}$ |
| $G_{13}$ | $G_0$ | $G_{14}$ |
| $G_{10}$ | $G_{11}$ | $G_{12}$ |
| $G_7$ | $G_8$ | $G_9$ |
| $G_4$ | $G_5$ | $G_6$ |
| $G_1$ | $G_2$ | $G_3$ |

FIG. 11

1101
MEASURED ANTENNA
SENSITIVITY
DISTRIBUTION
FUNCTION TABLE $(G_i(x,y))$

| SUFFIX(i) |
|---|
| X COORDINATE |
| Y COORDINATE |
| Z COORDINATE |

1102
TARGET ANTENNA
SENSITIVITY
DISTRIBUTION
FUNCTION TABLE $(F(x,y))$

| X COORDINATE |
|---|
| Y COORDINATE |
| Z COORDINATE |

1103
MEASURED
ANTENNA
SENSITIVITY
MATRIX TABLE $(H)$

| ROW |
|---|
| COLUMN |
| VALUE |

1105
SEED
VECTOR
TABLE $(v)$

| ROW |
|---|
| VALUE |

1104
INVERSE
MATRIX
TABLE $(R^{-1})$

| ROW |
|---|
| COLUMN |
| VALUE |

1106
CORRECTED ANTENNA
SENSITIVITY DISTRIBUTION
FUNCTION TABLE $(\Phi(x,y))$

| X COORDINATE |
|---|
| Y COORDINATE |
| Z COORDINATE |

FIG. 12A $$H = \begin{bmatrix} \Sigma G_0 \cdot G_0 & \Sigma G_0 \cdot G_1 & \Sigma G_0 \cdot G_2 & \cdots & \Sigma G_0 \cdot G_{26} \\ \Sigma G_1 \cdot G_0 & \Sigma G_1 \cdot G_1 & \Sigma G_1 \cdot G_2 & \cdots & \Sigma G_1 \cdot G_{26} \\ \Sigma G_2 \cdot G_0 & \Sigma G_2 \cdot G_1 & \Sigma G_2 \cdot G_2 & \cdots & \Sigma G_2 \cdot G_{26} \\ & & \vdots & & \vdots \\ \Sigma G_{25} \cdot G_0 & \Sigma G_{25} \cdot G_1 & \Sigma G_{25} \cdot G_2 & \cdots & \Sigma G_{25} \cdot G_{26} \\ \Sigma G_{26} \cdot G_0 & \Sigma G_{26} \cdot G_1 & \Sigma G_{26} \cdot G_2 & \cdots & \Sigma G_{26} \cdot G_{26} \end{bmatrix}$$

$$v = \begin{bmatrix} \Sigma F \cdot G_0 & \Sigma F \cdot G_1 & \Sigma F \cdot G_2 & \cdots & \Sigma F \cdot G_{26} \end{bmatrix}$$

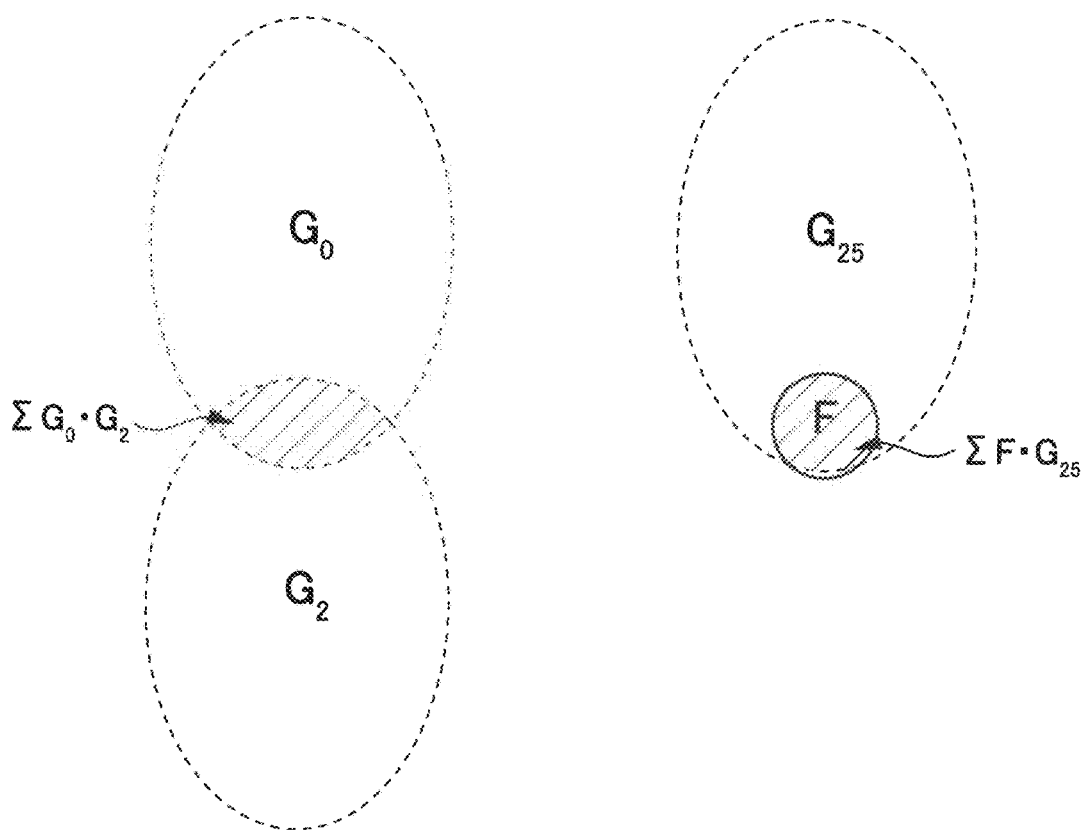

FIG. 12B  FIG. 12C

MEASUREMENT DATA PROCESSING DEVICE

BACKGROUND

Technical Field

The present invention relates to a measurement data processing device for improving spatial resolution for data output by a microwave radiometer that mainly receives a microwave.

Related Art

A microwave radiometer is an instrument that passively observes, for each of frequency components, the intensity of an extremely faint electromagnetic wave in a microwave region radiated from the ground surface. An object radiates a faint electromagnetic wave corresponding to the temperature of the object based on the Planck's blackbody radiation law. The microwave radiometer measures the power of the faint electromagnetic wave based on the blackbody radiation as brightness temperature.

The applicant operates an artificial satellite mounted with a microwave radiometer disclosed in "Global Change Observation Mission on Water (GCOM-W)" Internet www.jaxa.jp/projects/sat/gcom_w/ and carries out regular measurement of the sea surface temperature, the sea surface windspeed, the salinity concentration of the seawater, soil moisture, and so on.

JP 7-209359 A discloses technical content of a mechanical scanning microwave radiometer that enables unit area scanning of the earth surface or the like conically and at a predetermined fixed incident angle.

Maeda, T., K. Imaoka and Y. Taniguchi, GCOM-W1 AMSR2 Level 1R Product: Dataset of Brightness Temperature Modified Using the Antenna Pattern Matching Technique, IEEE Trans. on Geoscience and Remote Sensing, 54, 2, 770-782, 2016. Internet ieeexplore.ieee.org/stamp/stamp.jsp?tp=&arnumber=7244183 discloses technical content for improving the brightness of a microwave radiometer mounted on an artificial satellite.

SUMMARY

In the microwave radiometer mounted with the artificial satellite currently in operation disclosed in "Global Change Observation Mission on Water (GCOM-W)" Internet www.jaxa.jp/projects/sat/gcom_w, horn antennas are mounted for each of a plurality of frequency bands and a disk-like reflecting minor is driven to rotate at rotating speed of once in 1.5 seconds. In the microwave radiometer in the present state disclosed in "Global Change Observation Mission on Water (GCOM-W)" Internet www.jaxa.jp/projects/sat/gcom_w, a rotating portion including the reflecting mirror is as heavy as approximately 250 kg. The microwave radiometer in the present state has the following problems.

(1) First, since the microwave radiometer in the present state performs scanning for rotating the reflecting mirror, aged deterioration of mechanical movable components is inevitable by any means and, as a result, in-service life decreases.

(2) In the microwave radiometer in the present state, the size of the reflecting mirror needs to be increased to improve spatial resolution. However, since the reflecting mirror driven to rotate is used, there is a limit in the size of the reflecting mirror and resolution is inevitably low.

(3) Further, the microwave radiometer in the present state is equipped with the horn antennas for each of the plurality of frequency bands. However, since a receivable frequency band of these plurality of horn antennas is narrow, observation frequencies and frequency bands are fundamentally limited.

(4) In addition, the influence of radio frequency interference (RFI) due to artificial radio waves of broadcasting stations, cellular phones, and the like on the ground increases year by year. The frequencies of the artificial radio waves are shifting to frequencies in high affected frequency bands according to the progress of the radio wave communication technique. Accordingly, there is a concern about a situation in which the microwave radiometer observation will be more difficult in near future.

In order to solve the problems described above, the inventors invented a new phased array antenna device and applied for patent (Japanese Patent Application No. 2019-224449).

However, unlike consumer appliances distributed on the ground, large cost and labor and time for preparation are required to launch a new artificial satellite. Usually, an operation period is set for an artificial satellite. Even if an epoch-making new technique can be realized, an artificial satellite currently in operation has to continue to be operated until an operation period of the current artificial satellite expires.

Accordingly, in order to effectively utilize the current artificial satellite to the maximum, contrivance for improving resolution as much as possible has to be made using microwave radiometer output data at low resolution output by the current artificial satellite.

The wavelength of a microwave is long compared with visible light. In the case of the visible light, it is possible to relatively easily narrow a focus using a lens. However, in a lens for the microwave, it is not easy to narrow a focus because, for example, a loss is large and a frequency band is narrow.

Unlike on the ground, there is a limit in the size of antennas that can be mounted on flying objects such as an artificial satellite and an airplane. Accordingly, even if physical structure of an antenna is devised to sharpen the directivity of the antenna, an observation region for observing the ground from the artificial satellite is inevitably wide.

Since the altitude of the artificial satellite is approximately 700 km, the observation region on the ground reaches several hundred square kilometers. That is, only spatial resolution in several ten kilometer unit on one side can be realized.

Accordingly, the microwave radiometer mounted on the artificial satellite currently in operation can present a correct value of sea surface temperature only in the open sea away from the land up to several hundred kilometers.

An object of the present invention is to solve such problems and provide a measurement data processing device that can improve resolution by applying a correction operation to low-resolution microwave radiometer output data.

In order to solve the problems, a measurement data processing device of the present invention is a measurement data processing device that improves spatial resolution of measurement data involving two-dimensional coordinate information on a predetermined two-dimensional plane indicating signal intensity of a microwave received by a microwave radiometer from the two-dimensional plane using an antenna having predetermined directivity.

The measurement data processing device includes: a measurement data table that measures a result of the measurement of the signal intensity of the microwave by the microwave radiometer; a weighted vector table in which a weighted vector is stored; and a combination control unit that reads out predetermined measurement values from the measurement data table, reads out weighting coefficients matching the read-out measurement values from the weighted vector table, and outputs combinations of the measurement values and the weighting coefficients. Further, the measurement data processing device includes: a plurality of multipliers that multiply together the combinations of the measurement values and the weighting coefficients output from the combination control unit and output multiplication results; and an integrator that integrates the multiplication results of the plurality of multipliers.

According to the present invention, it is possible to improve the resolution of the microwave radiometer by applying the correction operation to the low-resolution microwave radiometer output data.

Problems, configurations, and effects other than those described above are clarified by the following explanation of an embodiment.

BRIEF DESCRIPTION OF DRAWINGS

FIG. 8 is a diagram showing a measured antenna sensitivity distribution function, in which an antenna sensitivity center is common to the center of an xy coordinate, and a target antenna sensitivity distribution function;

FIG. 11 is a diagram showing field configurations of various tables;

FIGS. 12A to 12C are schematic diagrams showing determinants indicating elements of a measured antenna sensitivity matrix H and a seed vector v and entities of the elements;

DETAILED DESCRIPTION

In the technical field of videos, there is a technique called super-resolution technique for obtaining video data having resolution exceeding the resolution of an original video using intra-frame interpolation or inter-frame interpolation. An object of the present invention can be considered similar to this super-resolution technique in terms of realizing spatial resolution exceeding the spatial resolution of original data. However, in output data of a microwave radiometer, temporally continuous frames in moving image data is absent.

Therefore, the spatial resolution of data is simulatively improved by adding or reducing, to or from measurement data at a certain measurement point, a value obtained by multiplying data of adjacent measurement points by a weighting coefficient. The present invention is a technique for calculating an optimum solution of the weighting coefficient.

[Measurement Data Processing Device 101: A Use Form]

Figure 1:
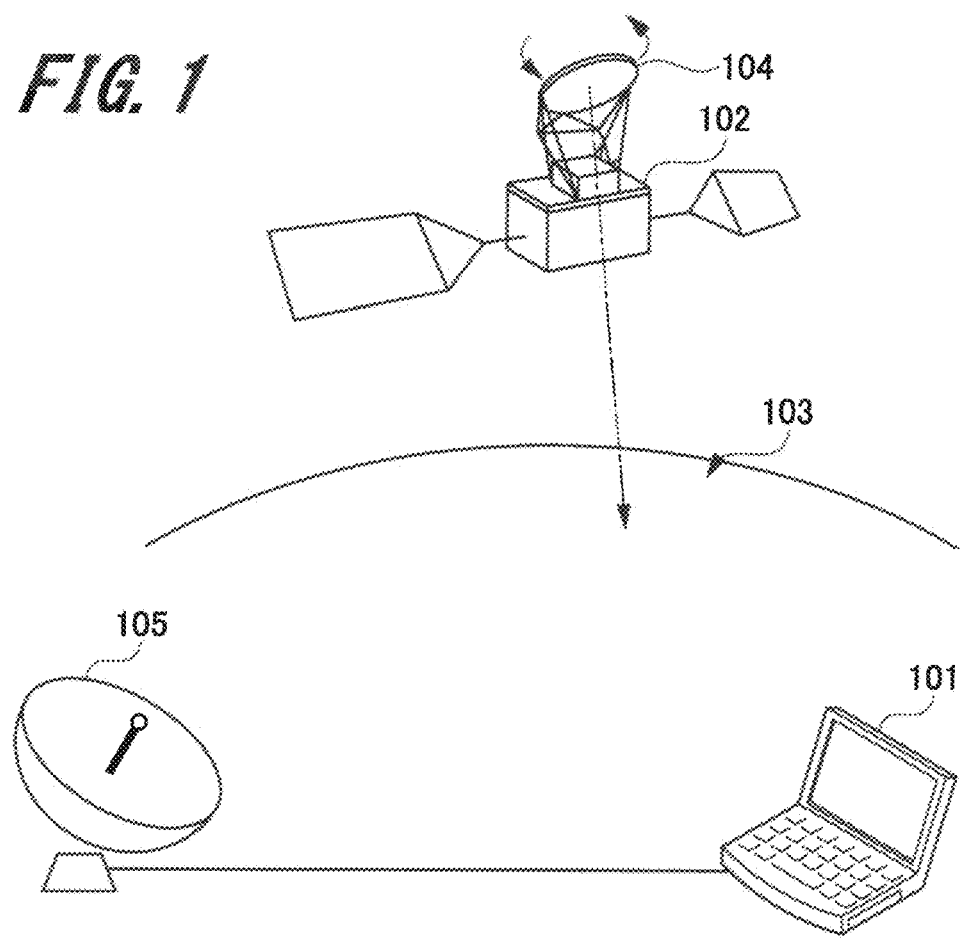
FIG. 1 is a schematic diagram showing a state of use of a measurement data processing device according to an embodiment of the present invention.

FIG. 1 is a schematic diagram showing a state of use of a measurement data processing device 101 according to an embodiment of the present invention.

A flying object such as an artificial satellite 102 or an airplane measures, with a not-shown microwave radiometer mounted thereon, a microwave radiated from a ground surface 103. An antenna (explained below with reference to FIGS. 5A and 5B) connected to the microwave radiometer scans the ground surface 103 through a reflecting mirror 104. The artificial satellite 102 wirelessly transmits measurement data measured by the microwave radiometer to a ground station 105.

The ground station 105 receives and demodulates a radio wave wirelessly transmitted from the artificial satellite 102 and obtains the measurement data. The measurement data is transmitted to the measurement data processing device 101.

The measurement data processing device 101, which is a general computer, converts the measurement data into a file and saves the measurement data in a nonvolatile storage 206 (see FIG. 2) and then executes a correction operation explained below to thereby generate corrected measurement data having spatial resolution higher than the spatial resolution of the measurement data.

The corrected measurement data is used for various uses. For example, the corrected measurement data is used for, for example, prediction of a fishing ground as, for example, sea surface temperature information presented to fishing boats.

[Measurement Data Processing Device 101: A Hardware Configuration]

Figure 2:
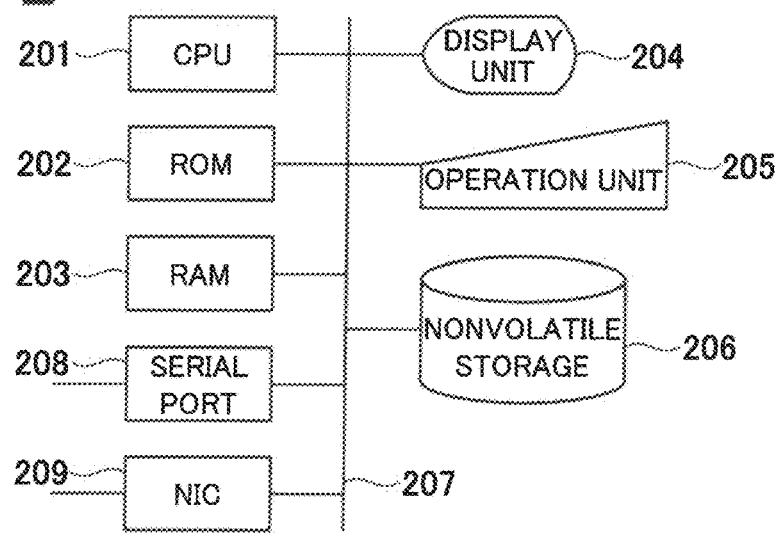
FIG. 2 is a block diagram showing a hardware configuration of the measurement data processing device.

FIG. 2 is a block diagram showing a hardware configuration of the measurement data processing device 101.

In the measurement data processing device 101, which is a general personal computer, a CPU 201, a ROM 202, a RAM 203, a display unit 204 such as a liquid crystal display, an operation unit 205 such as a keyboard and a mouse, and a nonvolatile storage 206 such as a hard disk device are connected to a bus 207. Besides, a serial port 208 and an NIC (Network Interface Card) 209 for receiving measurement data from the ground station 105 and registering the measurement data in a database formed in the nonvolatile storage 206 are connected to the bus 207. In the nonvolatile storage 206, an OS, a program for causing a personal computer to operate as the measurement data processing device 101, and various databases explained below are stored.

[Measurement Data Processing Device 101: A Software Function]

Figures 3A, 3B:
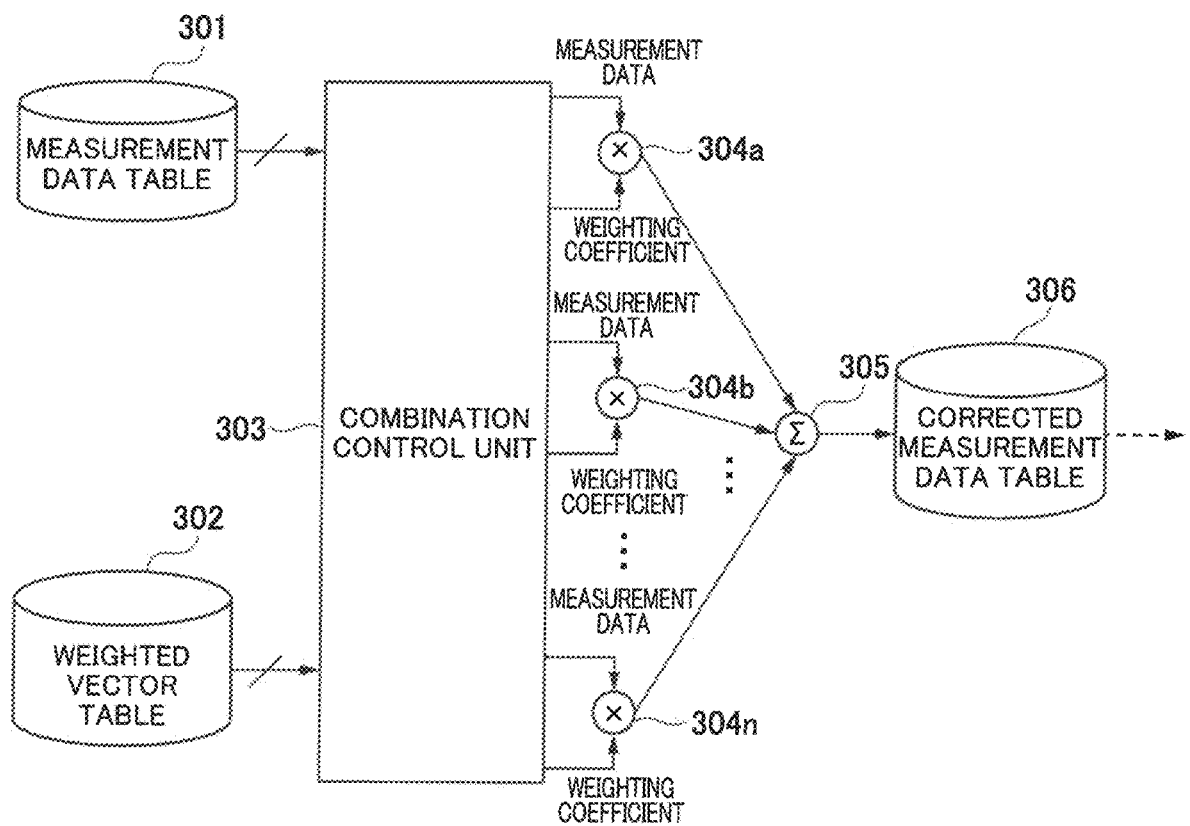
FIG. 3A is a block diagram showing a software function of the measurement data processing device.
FIG. 3B is a diagram showing field configurations of a measurement data table and a weighted vector table.

FIG. 3A is a block diagram showing a software function of the measurement data processing device 101. FIG. 3B is a diagram showing field configurations of a measurement data table 301 and a weighted vector table 302.

The measurement data received from the ground station 105 is stored in the measurement data table 301 of the nonvolatile storage 206.

On the other hand, a weighted vector calculated by a weighted vector operation device not shown in advance is stored in the weighted vector table 302.

The measurement data table 301 includes a date and time field, a serial number field, a frequency band field, and a measurement value field.

In the date and time field, data and time information of date and time when the antenna executed scan of the ground surface 103 (a two-dimensional plane) through the reflecting mirror 104 is stored. This is generally equal to date and time when the microwave radiometer measured the signal intensity of a microwave radiated from the ground surface 103.

In the serial number field, serial numbers added to measurement data (signal intensity) continuously output from the microwave radiometer in one scan of the ground surface 103 are stored. As explained below with reference to FIGS. 4A to 4C, every time the reflecting mirror 104 scans the ground surface 103 once, measurement data corresponding to angle positions of the reflecting mirror 104 is continuously output. In that case, serial numbers for uniquely identifying the respective measurement data are stored in the serial number field.

In other words, the serial numbers are position information on a scan track of the reflecting mirror 104.

In the frequency band field, information indicating a frequency band of the measurement data is stored. As explained below with reference to FIGS. 5A and 5B, horn antennas corresponding to a plurality of frequency bands are set in the artificial satellite 102. Therefore, measurement data for each of the frequency bands is output.

In the measurement value field, measurement data of the microwave radiometer, that is, the intensity of a microwave in a frequency band designated by a value of the frequency band field is stored.

A correspondence relation between the measurement data and the ground surface 103 cannot be linked only by the date and time information of the scan track of the reflecting mirror 104 stored in the date and time field of the measurement data table 301 and the serial numbers on the scan track stored in the serial number field of the measurement data table 301. Accordingly, by separately associating latitude and longitude information with the date and time information of the scan track of the reflecting mirror 104 based on revolution information of the artificial satellite 102, it is possible to link latitude and longitude on the ground surface 103 with the measurement data.

The weighted vector table 302 includes a center serial number field, an operation target position field, a frequency band field, and a coefficient field.

In the center serial number field, serial numbers of signal intensity output by the microwave radiometer, which are the center of a weighting operation, are stored.

The weighting operation indicates operation processing for integrating a value obtained by multiplying together the measurement data stored in the measurement data table 301 and the weighting coefficient stored in the weighted vector table 302, the operation processing being executed by a combination control unit 303, multipliers 304a, 304b, . . . , and 304n, and an integrator 305. The center of the weighting operation indicates measurement data located in the center of the directivity of an antenna explained below with reference to FIG. 10.

In the operation target position field, information indicating relative positions of measurement values, which are targets of the weighting operation, with respect to positions stored in the center serial number field is stored. Specifically, values indicating how far away in units of the number of scan tracks or how far away in units of serial numbers from the center position are stored.

A relation between the measurement data of the antenna stored in the center serial number field and operation target position information, which is the relative position information of the measurement value stored in the operation target position field, is explained below with reference to FIG. 10.

The frequency band field is the same as the same name field of the measurement data table 301.

In the coefficient field, weighting coefficients serving as elements of a weighted vector are stored.

A combination control unit 303 reads out predetermined measurement values from the measurement data table 301, reads out records of weighting vectors matching the read-out measurement values from the weighted vector table 302, combines the measurement values and the weighting coefficients forming the weighting vectors, and substitutes combinations of the measurement values and the weighting coefficients in multipliers 304a, 304b, . . . , and 304n following the combination control unit 303.

The multipliers 304a, 304b, . . . , and 304n multiply together the combinations of the measurement data and the weighting coefficients output from the combination control unit 303 and output multiplication results.

The respective multiplication results output from the plurality of multipliers 304a, 304b, . . . , and 304n are input to an integrator 305.

The integrator 305 integrates all the multiplication results and outputs corrected measurement data as an integration result. The corrected measurement data is stored in a corrected measurement data table 306. Like the original measurement data, date and time and address information such as serial numbers are linked with the corrected measurement data.

The measurement data processing device 101 executes a correction operation for the measurement data using a weighted vector derived in advance by an arithmetic operation of a weighted vector operation device (not shown in the figures). Note that the not-shown weighted vector operation device, which calculates the weighted vector, has the same hardware configuration as the hardware configuration of the measurement data processing device 101.

[Weighted Vector Operation: Configuration and Operation]

Calculation for calculating a weighting coefficient by the weighted vector operation device is an inverse problem for estimating relationship between an output and an input. Therefore, in the following explanation, a process in which the antenna of the microwave radiometer mounted on the artificial satellite 102 receives a microwave radiated from the ground surface 103 is replaced with a mathematical model and, then, a process for solving the inverse problem is explained. In the mathematical model, the microwave is considered to be radiated from the ground surface 103 at uniform and equal antenna power.

Figure 4A:
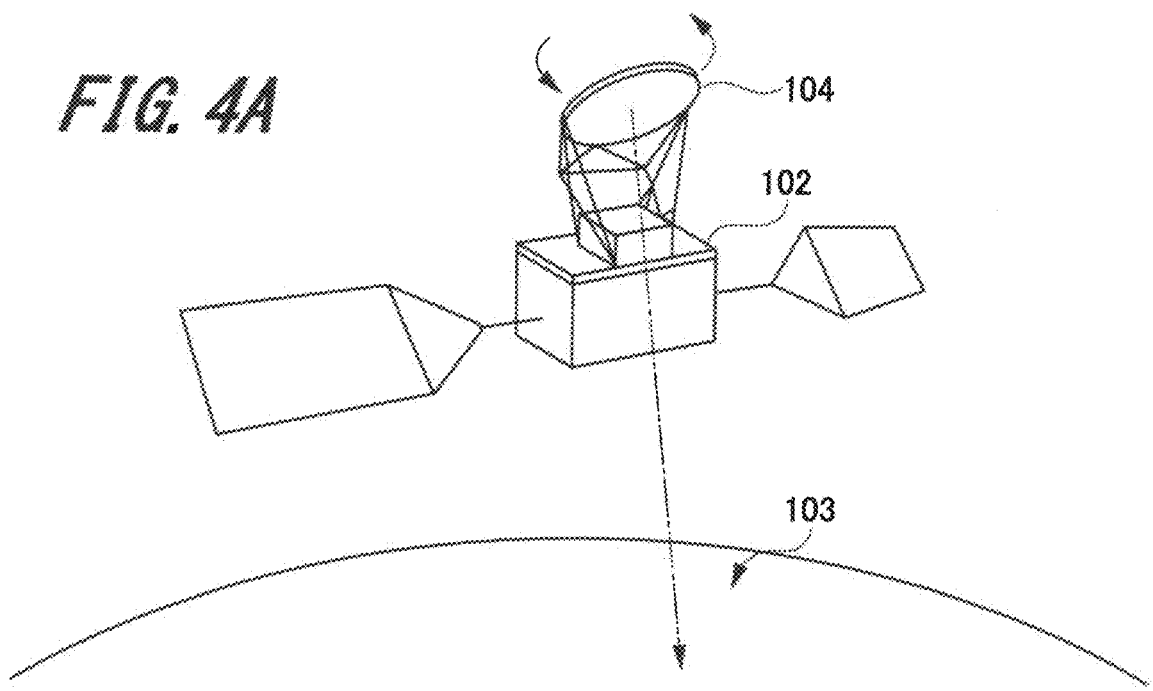
FIGS. 4A to 4C are explanatory diagrams showing a state in which an artificial satellite observes the ground surface.
Figure 4B:
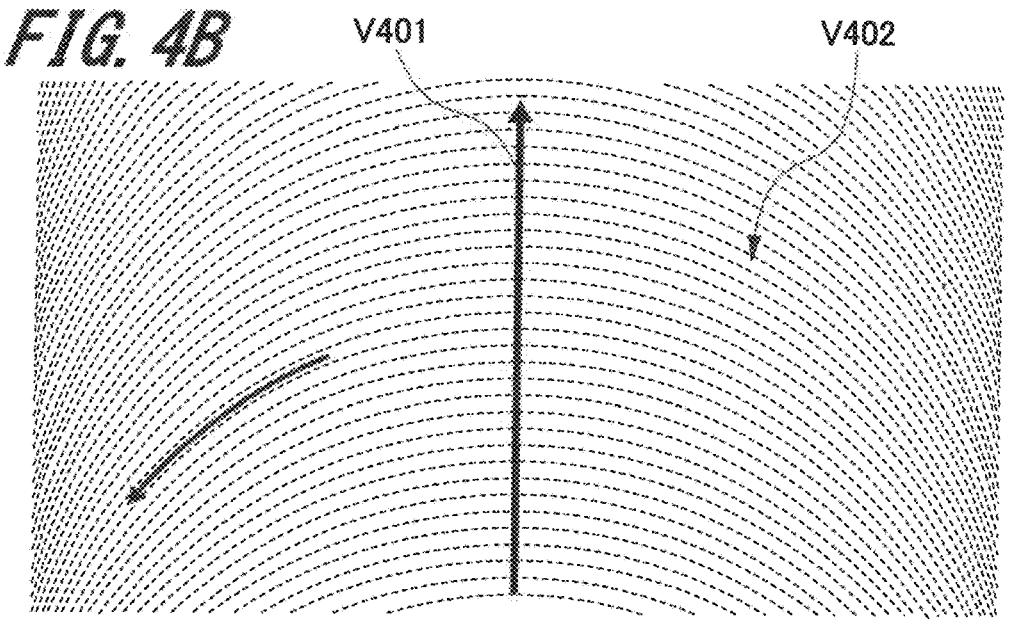
Figure 4C:
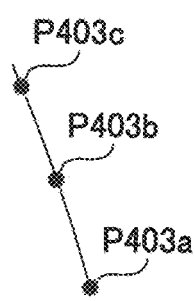

FIGS. 4A to 4C are explanatory diagrams showing a state in which the artificial satellite 102 observes the ground surface 103.

As shown in FIG. 4A, the reflecting mirror 104 driven to rotate, which configures a part of the antenna that receives the microwave, is mounted on the artificial satellite 102. When the reflecting mirror 104 rotates, a measurement point present in the center of the sensitivity of the antenna rotates. The artificial satellite 102 including the reflecting mirror 104 driven to rotate revolves, for example, on a revolving orbit V401 that passes the sky in our country.

Therefore, as shown in FIG. 4B, the measurement point present in the center of the sensitivity of the antenna draws an arcuate track centering on the revolving orbit V401. This is a scan track V402 of the reflecting mirror 104. When the scan track V402 is partially enlarged, as shown in FIG. 4C, measurement points P403a, P403b, P403c, . . . , are arranged. The artificial satellite 102 adds serial numbers to each of measurement data at these measurement points P403a, P403b, P403c, . . . , and transmits the measurement data to the ground station 105.

Measurement data indicating signal intensity of a microwave in a predetermined frequency band received from the artificial satellite 102 includes measurement data and time and relative position information in the center of the directivity of the antenna. Further, latitude and longitude information is linked with the measurement data. That is, the measurement data includes coordinate information on the ground surface 103 (a two-dimensional plane coordinate).

Figure 5A:
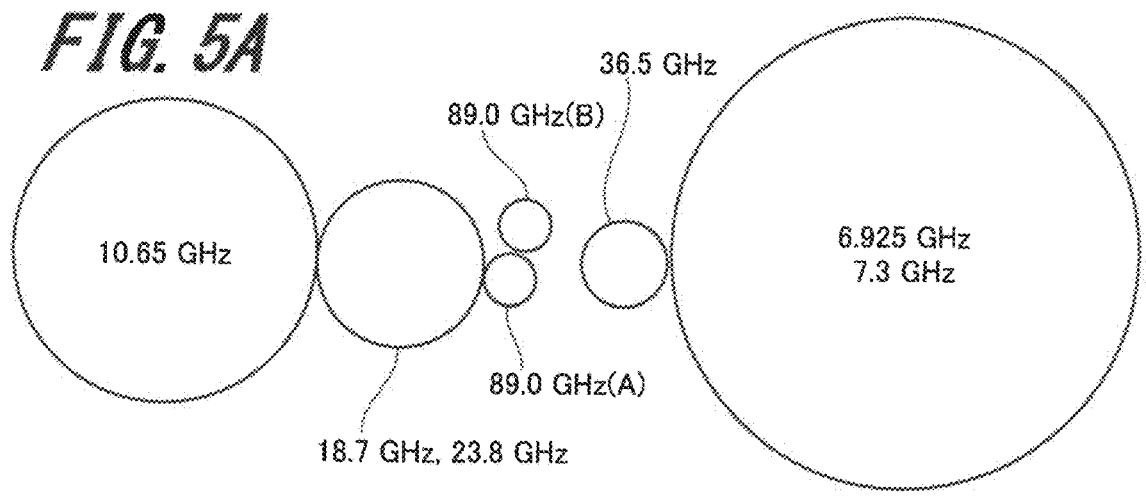
FIGS. 5A and 5B are explanatory diagrams showing an antenna configuration of artificial satellite currently in operation.
Figure 5B:
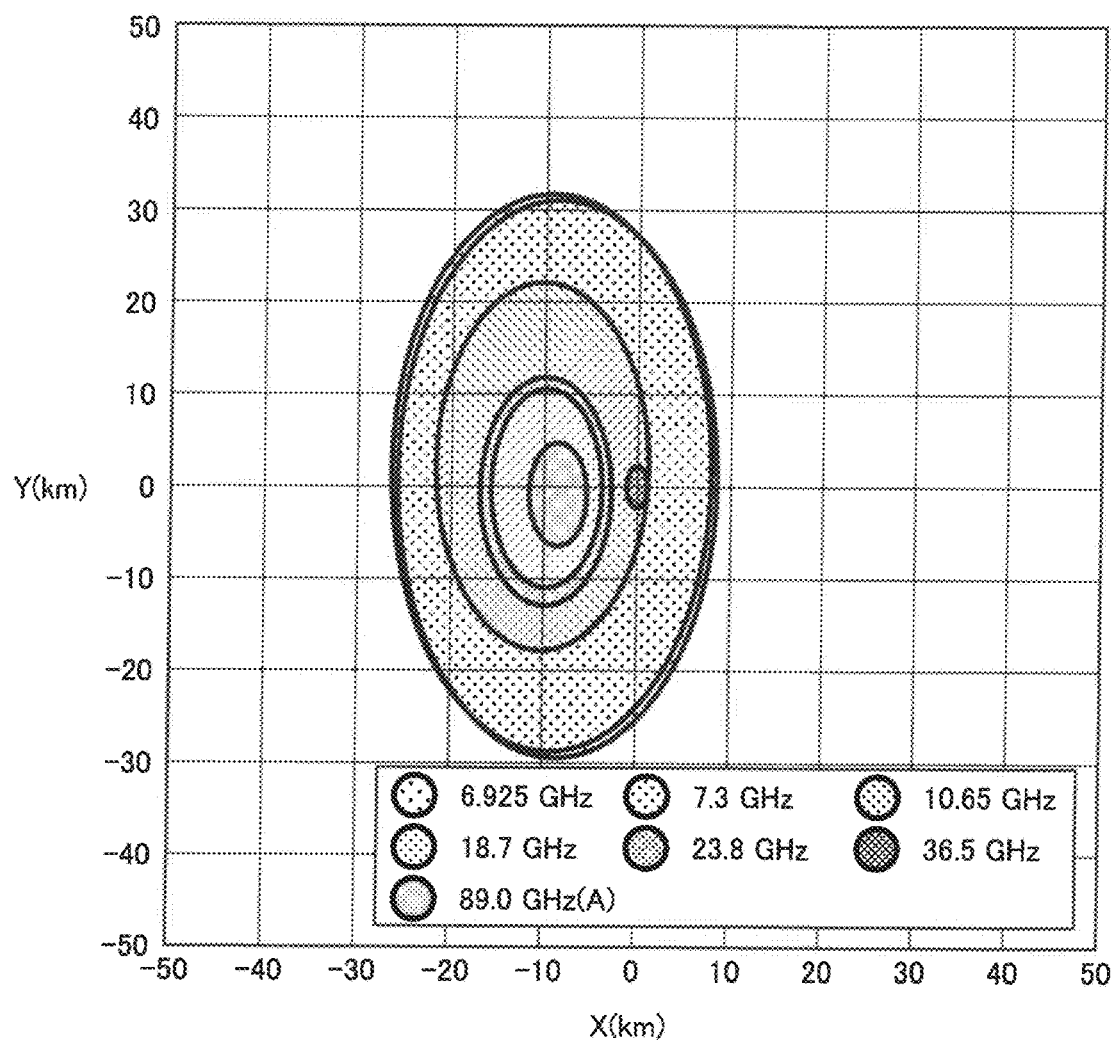

FIG. 5A is an explanatory diagram showing an antenna configuration of the artificial satellite 102 currently in operation. FIG. 5B is an explanatory diagram showing a sensitivity distribution at each of frequency bands of the artificial satellite 102 currently in operation.

A plurality of horn antennas are mounted on the artificial satellite 102 according to frequency bands of microwaves. The reflecting mirror 104 collectively reflects a reception radio wave to the plurality of horn antennas. The microwaves in these plurality of frequency bands are different depending on targets to be detected. Accordingly, the microwave radiometer outputs different measurement data for each of the frequency bands.

As it is well known, the directivity of a radio wave sharpens as a frequency rises. Therefore, the area of a sensitivity distribution is different for each of the frequency bands.

Figure 6:
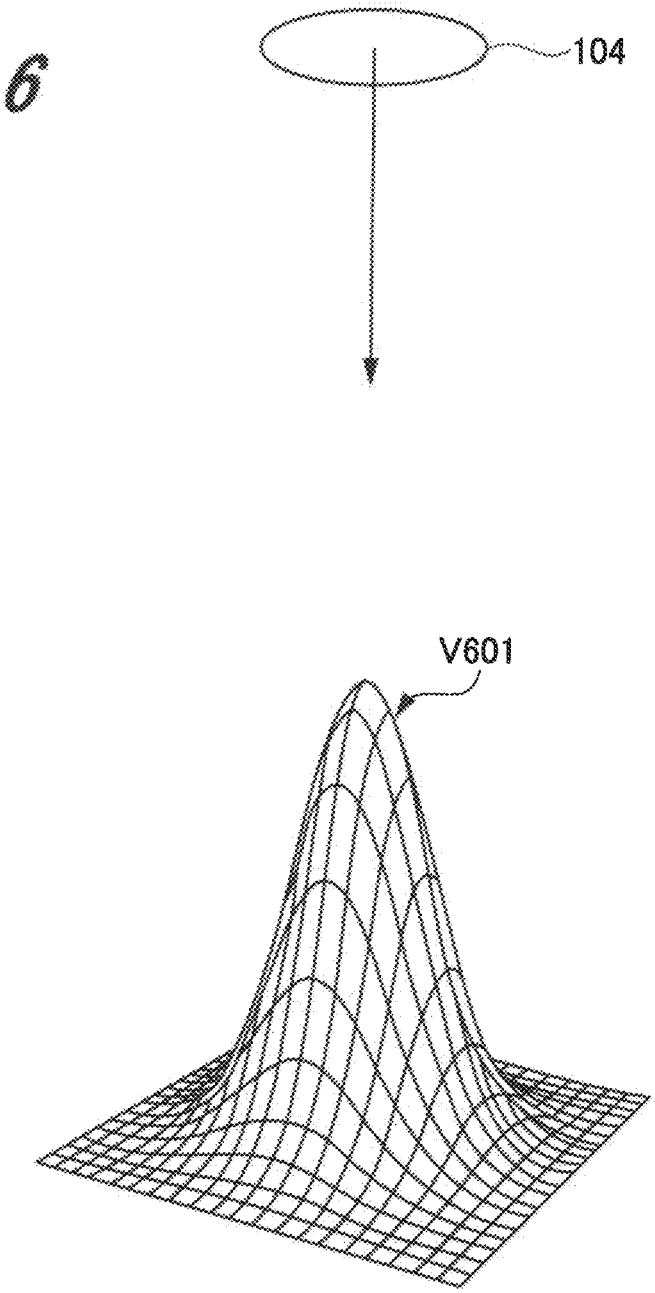
FIG. 6 is a schematic diagram for explaining a shape of sensitivity on the ground surface of an antenna mounted on the artificial satellite.

FIG. 6 is a schematic diagram for explaining a shape of a sensitivity distribution V601 on the ground surface 103 of the antenna mounted on the artificial satellite 102.

When the sensitivity distribution V601 representing the intensity of a radio wave received by the antenna mounted on the artificial satellite 102 from the ground surface 103 through the reflecting mirror 104 is stereoscopically drawn, as shown in FIG. 6, the sensitivity distribution V601 has a Gaussian curved surface shape. Note that, in FIG. 6, the antenna is drawn as being present in a position perpendicular from the ground surface 103. However, actually, the antenna is not perpendicular and has an inclination angle of, for example, approximately 40° to 60°. Therefore, the Gaussian curved surface also has a shape inclined to the direction of the artificial satellite 102. A projected shape of the sensitivity distribution V601 on the ground surface 103 is, as shown in FIG. 5B, an elliptical shape like lighting on the ground by a flashlight.

Figure 7A:
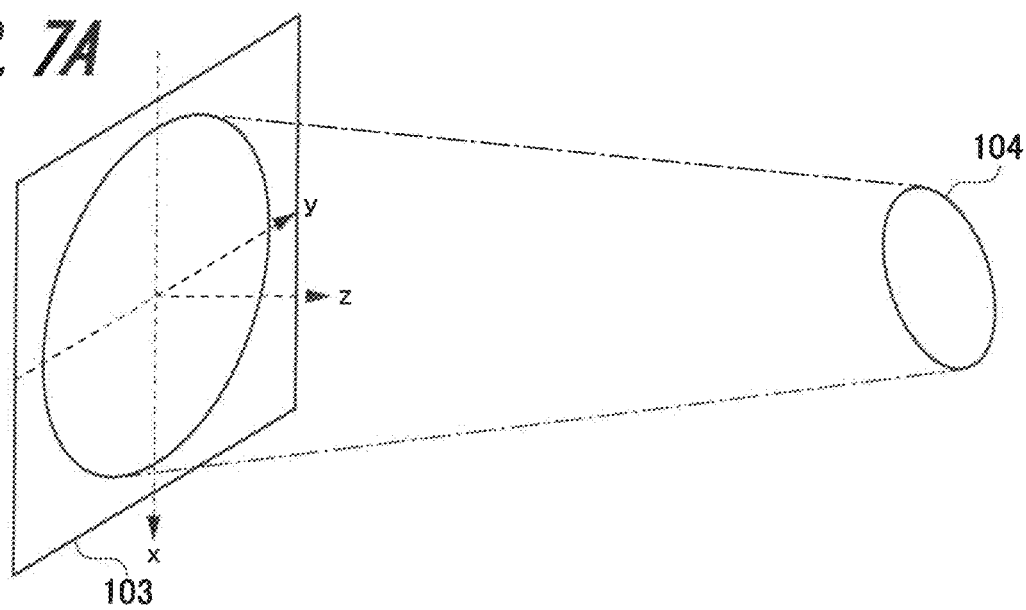
FIG. 7A is a schematic diagram for explaining sensitivity and a coordinate on the ground surface of the antenna mounted on the artificial satellite.

FIG. 7A is a schematic diagram for explaining sensitivity and a coordinate on the ground surface 103 of the antenna mounted on the artificial satellite 102.

Figure 7B:
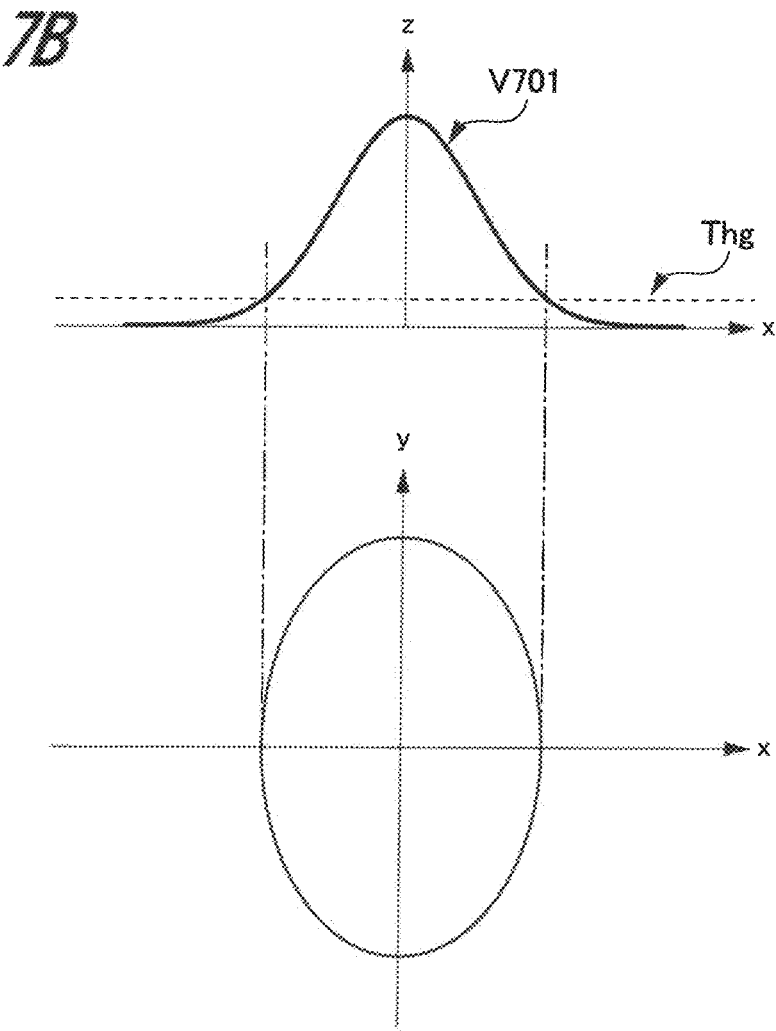
FIG. 7B is a schematic diagram for explaining a state in which the sensitivity on the ground surface is viewed from a horizontal plane and a state in which the sensitivity on the ground surface is viewed from a vertical plane.

FIG. 7B is a schematic diagram for explaining a state in which the sensitivity on the ground surface 103 of the antenna mounted on the artificial satellite 102 is viewed from a horizontal plane and a state in which the sensitivity on the ground surface 103 of the antenna is viewed from a vertical plane.

As shown in FIG. 7A, an xy coordinate having the origin at a point where the sensitivity of the antenna is the maximum and a z coordinate indicating sensitivity perpendicularly from the ground surface 103 are created. The xy coordinate has an image of, for example, forming graph paper-like scales in units of 1 km on the ground surface 103.

When viewed from a side, the sensitivity distribution of the antenna in FIG. 7A is a Gaussian curve V701 shown in FIG. 7B. In the following explanation, a Gaussian curved surface indicating the sensitivity distribution of the antenna is represented as a measured antenna sensitivity distribution function $G(x,y)$. It is assumed that the measured antenna sensitivity distribution function $G(x,y)$ is a function obtained by normalizing volume to 1 in order to decide a mathematical model. Note that the shape of the measured antenna sensitivity distribution function viewed on the ground surface 103 from the above is an elliptical shape like lighting on the ground by a flashlight as explained with reference to FIG. 5B because a radio wave from the artificial satellite 102 to the ground surface 103 is received in an inclined direction rather than perpendicularly (see FIG. 7B). The elliptical shape and the size of the measured antenna sensitivity distribution function in FIG. 7B are determined based on the sensitivity distribution of the antenna shown in FIG. 5B.

In FIG. 7B, a threshold Thg is set for the measured antenna sensitivity distribution function $G(x, y)$. For example, the threshold Thg is a value equivalent to −30 dB. A range affecting the reception sensitivity of the antenna is decided using the threshold Thg to determine a range of an arithmetic operation explained below.

FIG. 8 is a diagram showing a measured antenna sensitivity distribution function, in which an antenna sensitivity center is common to the center of an xy coordinate, and a target antenna sensitivity distribution function.

As explained above, the object of the present invention is to realize a narrower (higher-resolution) sensitivity distribution by adding a value obtained by multiplying a measurement value around the antenna by a weighting coefficient to an original wide sensitivity distribution of the antenna. Therefore, in the present invention, first, a sensitivity distribution desired to be set as a target is determined. In FIG. 8, a narrower circular target antenna sensitivity distribution A802 is decided with respect to an elliptical measured antenna sensitivity distribution A801. In the following explanation, a Gaussian curved surface indicating a sensitivity distribution of the antenna desired to be set as a target is represented as a target antenna sensitivity distribution function $F(x,y)$. It is assumed that, like the measured antenna sensitivity distribution function G explained above, the target antenna sensitivity distribution function F is a function obtained by normalizing volume to 1. A threshold Thf is set for the target antenna sensitivity distribution function F.

Figure 9B:
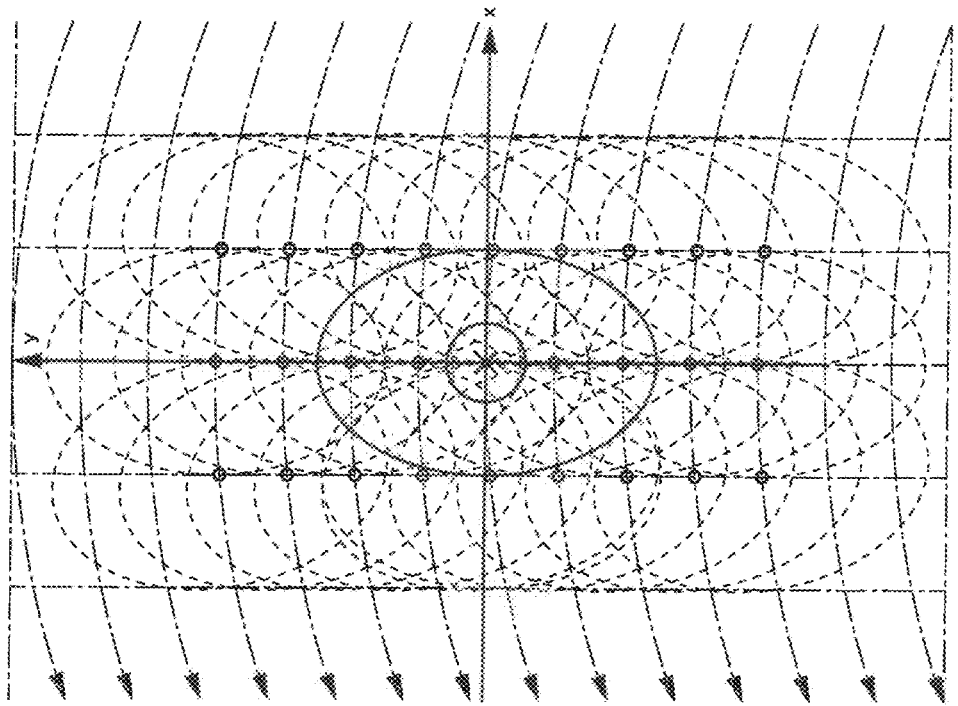
FIGS. 9A and 9B are diagrams for explaining an arithmetic operation target of a measured antenna sensitivity distribution function G.
Figure 9A:
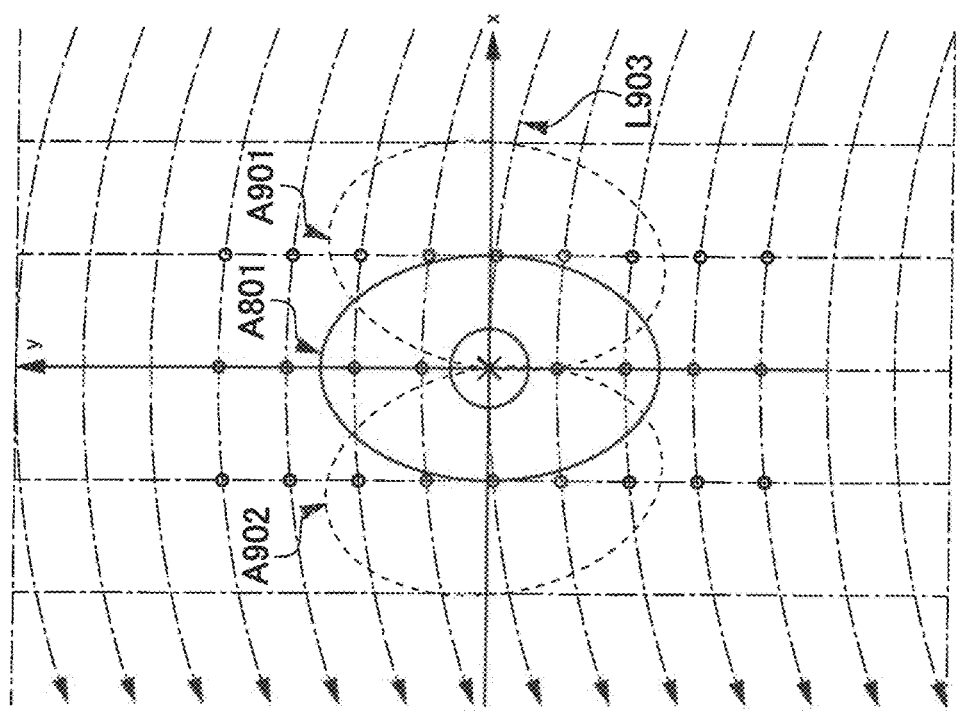

FIGS. 9A and 9B are diagrams for explaining an arithmetic operation target of the measured antenna sensitivity distribution function G.

Figures 10A, 10B:
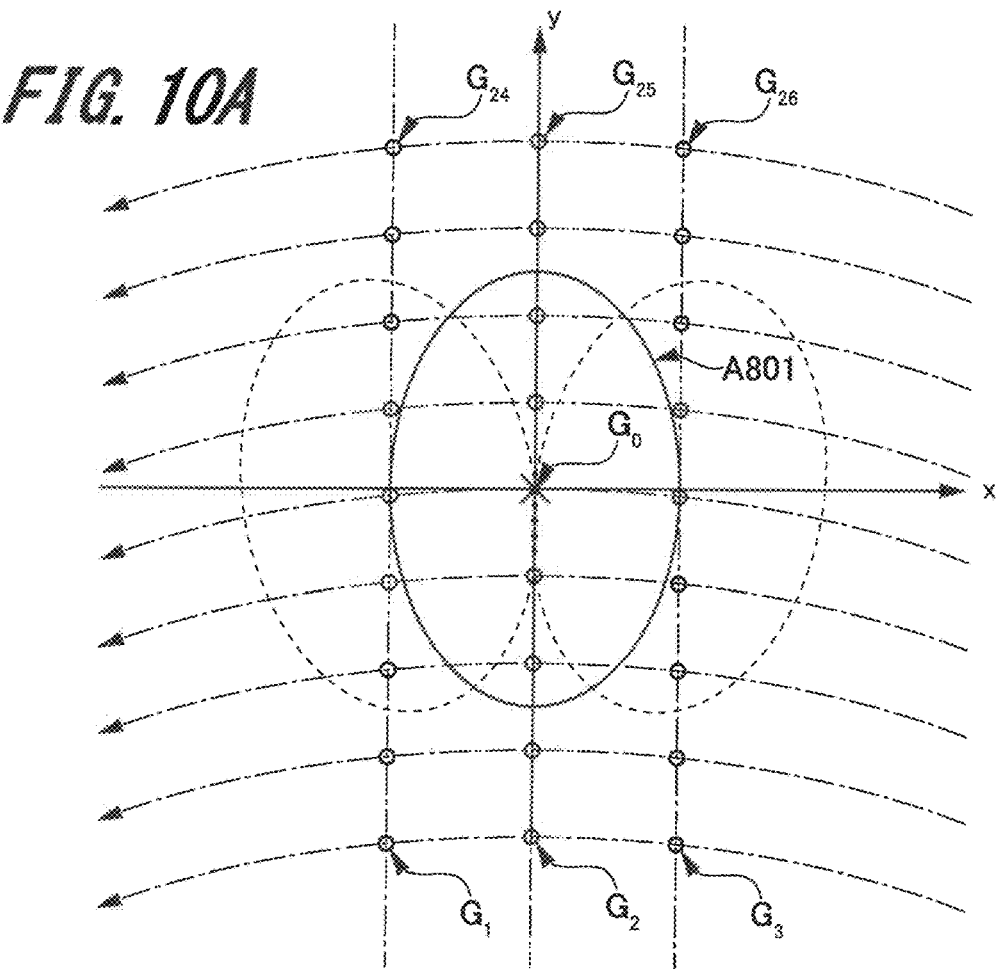
FIGS. 10A and 10B are diagrams for explaining suffixes given to the measured antenna sensitivity distribution function G.

FIGS. 10A and 10B are diagrams for explaining suffixes given to the measured antenna sensitivity distribution function G.

In the present invention, a measured antenna sensitivity distribution function $G_0(x,y)$ (the measured antenna sensitivity distribution A801 in FIG. 9A), the center of which coincides with the center of the target antenna sensitivity distribution function F(x,y) located in the center of the coordinate, is focused. Another measured antenna sensitivity distribution function, an effective sensitivity distribution of which crosses $G_0(x,y)$, is set as a target of an arithmetic operation for multiplying a weighting coefficient.

First, as shown in FIG. 9A, since the reflecting mirror 104 of the artificial satellite 102 rotates, a track of the sensitivity center of the antenna is drawn on a coordinate plane. Ellipses crossing an ellipse indicating a range of $G_0(x,y)$ (the measured antenna sensitivity distribution A801) are drawn on the left and the right (measured antenna sensitivity distributions A901 and A902). In that case, an inclination is given to maintain an angle with respect to a track L903 of the sensitivity center of the antenna.

As shown in FIG. 9B, ellipses crossing the ellipse of $G_0(x,y)$ in the center are determined. In FIG. 9B, it is seen that 3 columns×9 rows–1=26 ellipses cross $G_0(x,y)$ in the center. The twenty-seven ellipses described above are measured antenna sensitivity distribution functions $G_0(x,y)$ to $G_N(x,y)$, based on which the target antenna sensitivity distribution function F(x,y) is calculated.

Note that, in FIGS. 9A and 9B, a small number of ellipses are shown on purpose for easiness of understanding. However, actually, the number of ellipses increases according to space density of measurement data.

The measured antenna sensitivity distribution functions $G_0(x,y)$ to $G_i(x,y)$ and the target antenna sensitivity distribution function F(x,y) are defined as having a relation indicated by Expression 1 and Expression 2 described below.

[Math 1]

$$\iint_s G(x,y)dxdy=1 \quad \text{(Expression 1)}$$

$$\iint_s F(x,y)dxdy=1 \quad \text{(Expression 2)}$$

The present invention calculates an optimum value of a weighted vector "a" having, as elements, weighting coefficients $a_0$ to $a_i$ by which the measured antenna sensitivity distribution functions $G_0(x,y)$ to $G_i(x,y)$ in Expression 1 are multiplied.

When the measured antenna sensitivity distribution functions G set as targets of an arithmetic operation are determined as shown in FIG. 10A, suffixes are added to the ellipses of the measured antenna sensitivity distribution functions G as shown in a table of FIG. 10B. In FIGS. 10A and 10B, as an example, the measured antenna sensitivity distribution function G in the center is decided as $G_0(x,y)$ and the measured antenna sensitivity distribution functions G are decided as $G_1(x,y)$, $G_2(x,y)$, $G_3(x,y)$, ..., $G_{25}(x,y)$, and $G_{26}(x,y)$ from the lower left to the upper right. As explained above, twenty-seven measured antenna sensitivity distribution functions Gi(x,y) from 0 to 26 (=27–1) are decided.

"$G_0$" in the table of FIG. 10B corresponds to the measurement data of the antenna stored in the center serial number field of the weighted vector table 302. The center of the weighting operation indicates this $G_0$.

Positions of "$G_1$" to "$G_{26}$" in the table of FIG. 10B correspond to information indicating relative positions of the measurement values, which are the targets of the weighting operation, with respect to the position ($G_0$) stored in the center serial number field.

FIG. 11 is a diagram showing field configurations of various tables. Note that, among the tables shown in FIG. 11, a measured antenna sensitivity matrix table 1103, a seed vector table 1105, an inverse matrix table 1104, and a corrected antenna sensitivity distribution function table 1106 are explained with reference to FIG. 12 and subsequent figures.

A measured antenna sensitivity distribution function table 1101 ($G_i(x,y)$) includes a suffix field, an X coordinate field, a Y coordinate field, and a Z coordinate field.

In the suffix field, suffixes (natural numbers equal to or larger than 1 and equal to or smaller than N–1) of functions $G_0(x,y)$ to $G_{N-1}(x,y)$ explained with reference to FIG. 10 are stored.

In the X coordinate field, an X coordinate on an xy coordinate plane is stored.

In the Y coordinate field, a Y coordinate on the xy coordinate plane is stored.

In the Z coordinate field, a value equivalent to the sensitivity (the gain) of the antenna is stored.

That is, $G_0(x,y)$ to $G_{N-1}(x,y)$ explained with reference to FIGS. 10A and 10B are retained in this one table. Note that a value N of the suffixes increases or decreases depending on the position of the origin plotted on the ground surface 103. Therefore, such field configurations are set.

A target antenna sensitivity distribution function table 1102 (F(x,y)) includes an X coordinate field, a Y coordinate field, and a Z coordinate field.

All of the X coordinate field, the Y coordinate field, and the Z coordinate field are the same as the same name fields of the measured antenna sensitivity distribution function table 1101.

As explained above, the measured antenna sensitivity distribution function table 1101 (Gi(x,y)) and the target antenna sensitivity distribution function table 1102 (F(x,y)) are decided. Consequently, materials for solving the inverse problem for deriving the weighting coefficient are decided. Work for specifically solving the inverse problem is explained. As a solution of the inverse problem, a Backus-Gilbert method (hereinafter abbreviated as "BG method") disclosed in Maeda, T., K. Imaoka and Y. Taniguchi, GCOM-W1 AMSR2 Level 1R Product: Dataset of Brightness Temperature Modified Using the Antenna Pattern Matching Technique, IEEE Trans. on Geoscience and Remote Sensing, 54, 2, 770-782, 2016. Internet ieeexplore.ieee.org/stamp/stamp.jsp?tp=&arnumber=7244183 is adopted.

First, as a preparation for executing the BG method, a measured antenna sensitivity matrix H and a seed vector v are calculated.

FIGS. 12A to 12C are schematic diagrams showing determinants indicating elements of the measured antenna sensitivity matrix H and the seed vector v and entities of the elements.

The measured antenna sensitivity matrix H is an N rows×N columns square vector. In the case of the example shown in FIGS. 10A and 10B, since N is 27, the measured antenna sensitivity matrix H is a 27 rows×27 columns square matrix.

The seed vector v is a 1 row×N columns (or N rows×1 column) vector. In the case of the example shown in FIGS. 10A and 10B, since N is 27, the seed vector v is a 1 row×27 columns (or 27 rows×1 column) vector.

As shown in FIG. 11, a measured antenna sensitivity matrix table 1103 and an inverse matrix table 1104 include a row field, a column field, and a value field.

A row number of a matrix is stored in the row field.

A column number of the matrix is stored in the column field.

A value of an element of the matrix is stored in the value field.

A seed vector table 1105 includes a row field and a value field.

The row field and the value field of the seed vector table 1105 are the same as the same name fields of the measured antenna sensitivity matrix table 1103.

Elements of the measured antenna sensitivity matrix H is represented by Expression 3 described below.

[Math 2]

$$G_{ij} = \iint_s G_i(x,y) G_j(x,y) dx dy \quad \text{(Expression 3)}$$

Expression 3 described above means integration of multiplication of parts where Gaussian curved surfaces of measured antenna sensitivity distribution function $G_i$ cross. That is, volume in a range affecting an adjacent measured antenna sensitivity distribution function is calculated.

Since Expression 3 is a continuous value, calculation on an actual computer is calculation of a discrete value indicated by Expression 4 described below.

[Math 3]

$$G_{ij} = \Sigma G_i(x,y) G_j(x,y) \quad \text{(Expression 4)}$$

On the computer, values of z in a recode in which both of a value of x and a value of y are the same are multiplied together and a total of multiplied values of z is output.

Elements of the seed vector v are represented by Expression 5 described below.

[Math 4]

$$v_i = \iint_s G_i(x,y) F(x,y) dx dy \quad \text{(Expression 5)}$$

Expression 5 described above means integration of multiplication of parts where Gaussian curved surfaces of the measured antenna sensitivity distribution function $G_i$ and the target antenna sensitivity distribution function F cross. That is, volume in a range affecting a measured antenna sensitivity distribution function adjacent to a target antenna sensitivity distribution function is calculated.

Note that, since Expression 5 is a continuous value, calculation on an actual computer is calculation of a discrete value indicated by Expression 6 described below.

[Math 5]

$$v_i = \Sigma G_i(x,y) F(x,y) \quad \text{(Expression 6)}$$

As in the calculation of the measured antenna sensitivity distribution function, on the computer, values of z in a recode in which both of a value of x and a value of y are the same are multiplied together and a total of multiplied values of z is output.

When the measured antenna sensitivity matrix H and the seed vector v are decided as explained above, a weighted coefficient vector "a" is calculated by the BG method.

First, a vector u is calculated by Expression 7 based on the measured antenna sensitivity distribution function $G_i(x,y)$.

[Math 6]

$$u_i = \iint_s G_i(x,y) dx dy \quad \text{(Expression 7)}$$

Since integration of all measured antenna sensitivity distribution functions $G_i(x,y)$ is defined to be 1 as explained above, all elements of the vector u indicated by Expression 6 are 1.

A deformed measured antenna sensitivity matrix R is calculated from the measured antenna sensitivity matrix H. The deformed measured antenna sensitivity matrix R is, as indicated by Expression 8, a matrix obtained by adding, to the measured antenna sensitivity matrix H, a matrix obtained by multiplying a unit matrix I by a scalar value κ. Note that the scalar value κ is a rational number equal to or larger than 0. An appropriate value is selected as the scalar value κ.

[Math 7]

$$R = H + \kappa i \quad \text{(Expression 8)}$$

The weighted vector "a" with the number of elements N is obtained by performing an arithmetic operation of Expression 9 of the BG method using an inverse matrix $R^{-1}$ of the deformed measured antenna sensitivity matrix R, the seed vector v, and the vector u.

[Math 8]

$$a = R^{-1}\left[v + \left(\frac{1 - u^T V^{-1} v}{u^T V^{-1} u}\right) u\right] \quad \text{(Expression 9)}$$

The calculation method for the weighted vector "a" using the publicly-known BG method in Maeda, T., K. Imaoka and Y. Taniguchi, GCOM-W1 AMSR2 Level 1R Product: Dataset of Brightness Temperature Modified Using the Antenna Pattern Matching Technique, IEEE Trans. on Geoscience and Remote Sensing, 54, 2, 770-782, 2016. Internet ieeexplore.ieee.org/stamp/stamp.jsp?tp=&arnumber=7244183 is as explained above.

However, in the stage explained above, as explained below, a calculation result includes a non-negligible error. When the target antenna sensitivity distribution function F(x,y) and the measured antenna sensitivity distribution function G0(x,y) having the same center coordinate are compared, the error appears as a region indicating a positive value and a region indicating a negative value in a region excluding coordinate data of the target antenna sensitivity distribution function F(x,y) of the measured antenna sensitivity distribution function G0(x,y). This error is explained in detail with reference to FIGS. 16A to 16F.

The present invention realizes a method of minimizing this error.

Figure 13:
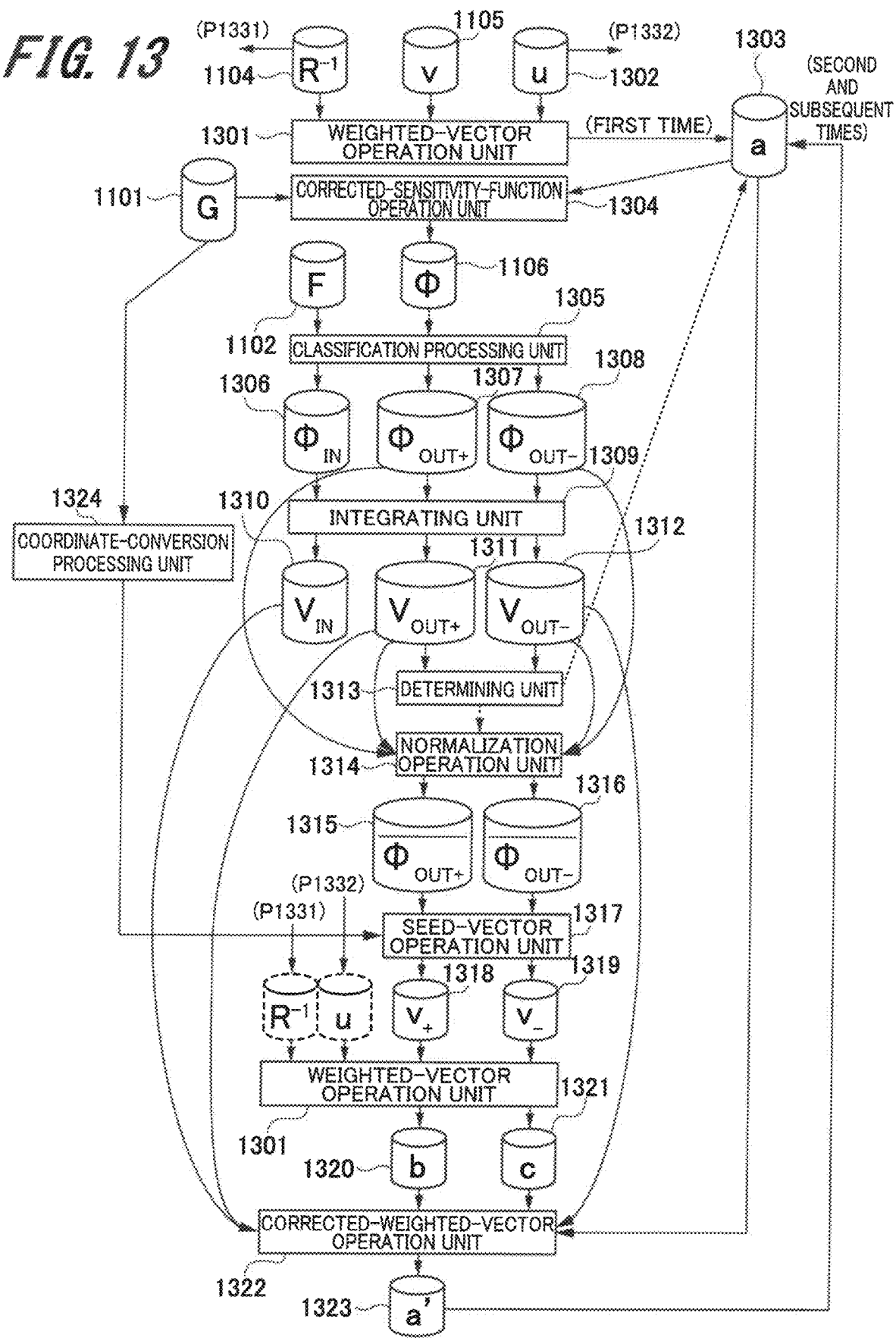
FIG. 13 is a software functional block diagram showing calculation of a weighted vector by a weighted vector operation device.

FIG. 13 is a software functional block diagram showing calculation of a weighted vector by a weighted vector operation device.

Figure 14:
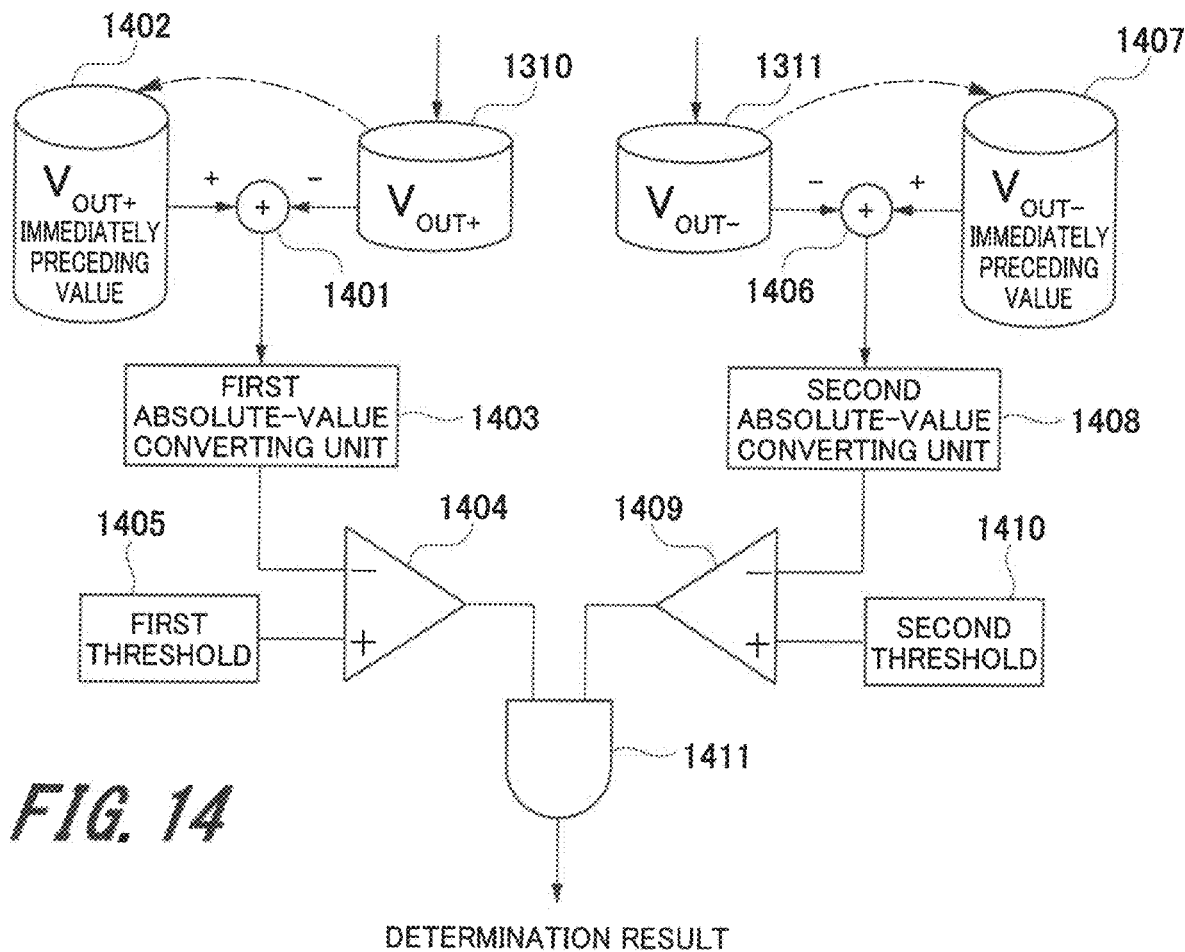
FIG. 14 is a software functional block diagram of a determining unit.

FIG. 14 is a software functional block diagram of a determining unit.

Figure 15:
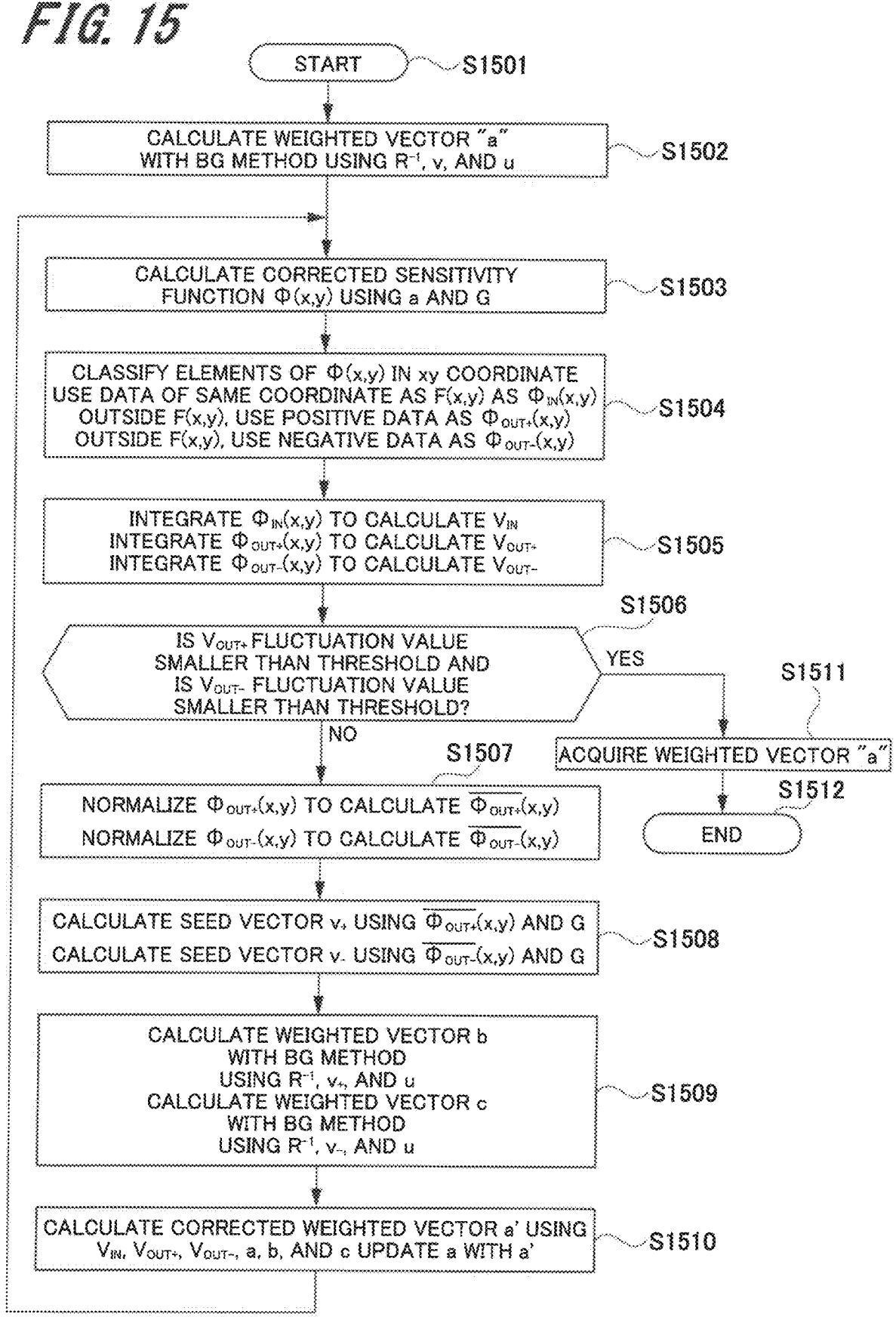
FIG. 15 is a flowchart of a software function for calculating a weighted vector.

FIG. 15 is a flowchart of a software function for calculating a weighted vector.

As shown in FIG. 15, when processing is started (S1501), first, a weighted-vector operation unit 1301 calculates a weighted vector 1303 (a) with the BG method using an inverse matrix table 1104 ($R^{-1}$), a seed vector table 1105 (v), and an integrated value vector 1302 (u) (S1502). This conforms to the arithmetic processing explained above.

The following steps are looped.

Subsequently, a corrected-sensitivity-function operation unit 1304 calculates a corrected sensitivity function Φ(x,y) using the weighted vector 1303 (a) and a measured antenna sensitivity distribution function table 1101 (G) (S1503). As the corrected sensitivity function Φ(x,y), actually, data is stored in a corrected antenna sensitivity distribution function table 1106 as a discrete value.

The corrected sensitivity function Φ(x,y) is calculated by calculating Expression 10.

[Math 9]

$$\Phi(x,y) = \sum_{i=0}^{N-1} a_i G_i(x,y) \quad \text{(Expression 10)}$$

where $$\sum_{i=0}^{N-1} G_i = 1 \quad \text{(Expression 11)}$$

As shown in FIG. 11, like the target antenna sensitivity distribution function table 1102 (F), the corrected antenna sensitivity distribution function table 1106 (Φ) includes an X coordinate field, a Y coordinate field, and a Z coordinate field.

Subsequently, as shown in FIG. 15, a classification processing unit 1305 collates an xy coordinate of the corrected antenna sensitivity distribution function table 1106 (Φ) with an xy coordinate of the target antenna sensitivity distribution function table 1102 (F) and classifies the xy coordinate (S1504).

That is, as shown in FIG. 13, the classification processing unit 1305 creates a corrected true value sensitivity function table 1306 using data of the same coordinate as the target antenna sensitivity distribution function table 1102 (F) as an element forming a corrected true value sensitivity function $\Phi_{IN}(x,y)$.

The classification processing unit 1305 creates, outside the xy coordinate of the target antenna sensitivity distribution function table 1102 (F), a positive remainder sensitivity function table 1307 using data having a positive value as an element forming a positive remainder sensitivity function $\Phi_{OUT+}(x,y)$.

Further, the classification processing unit 1305 creates, outside the xy coordinate of the target antenna sensitivity distribution function table 1102 (F), a negative remainder sensitivity function table 1308 using data having a negative value as an element forming a negative remainder sensitivity function $\Phi_{OUT-}(x,y)$.

Processing in step S1504 in FIG. 15 is as explained above.

The corrected true value sensitivity function table 1306, the positive remainder sensitivity function table 1307, and the negative remainder sensitivity function table 1308 shown in FIG. 13 are subsets of the corrected antenna sensitivity distribution function table 1106. Therefore, the corrected true value sensitivity function table 1306, the positive remainder sensitivity function table 1307, and the negative remainder sensitivity function table 1308 respectively include the same fields as the fields of the corrected antenna sensitivity distribution function table 1106.

Subsequently, as shown in FIG. 15, an integrating unit 1309 executes Expression 12, Expression 13, and Expression 14 to calculate a corrected true value integrated value 1310 ($V_{IN}$), a positive remainder integrated value 1311 ($V_{OUT+}$), and a negative remainder integrated value 1312 ($V_{OUT-}$) (S1505).

[Math 10]

$$\iint_s \Phi_{IN}(x,y)\,dx\,dy = V_{IN} \quad \text{(Expression 12)}$$

$$\iint_s \Phi_{OUT+}(x,y)\,dx\,dy = V_{OUT+} \quad \text{(Expression 13)}$$

$$\iint_s \Phi_{OUT-}(x,y)\,dx\,dy = V_{OUT-} \quad \text{(Expression 14)}$$

That is, the integrating unit 1309 shown in FIG. 13 integrates the corrected true value sensitivity function table 1306 ($\Phi_{IN}$) and calculates the corrected true value integrated value 1310 ($V_{IN}$), which is a scalar value.

The integrating unit 1309 integrates the positive remainder sensitivity function table 1307 ($\Phi_{OUT+}$) and calculates the positive remainder integrated value 1311 ($V_{OUT+}$), which is a scalar value.

Further, the integrating unit 1309 integrates the negative remainder sensitivity function table 1308 ($\Phi_{OUT-}$) and calculates the negative remainder integrated value 1312 ($V_{OUT-}$), which is a scalar value.

Processing in step S1505 in FIG. 15 is as explained above.

Processing by a determining unit 1313 shown in FIG. 13 is explained with reference to FIG. 14.

The positive remainder integrated value 1310 ($V_{OUT+}$) output by the integrating unit 1309 is input to a first adder 1401. The first adder 1401 outputs a value obtained by subtracting the positive remainder integrated value 1310 ($V_{OUT+}$) from a $V_{OUT+}$ immediately preceding value 1402.

Output data of the first adder 1401 is input to a first absolute-value converting unit 1403. If the output data of the first adder 1401 is a positive value, the first absolute-value converting unit 1403 directly outputs the output data. If the output data of the first adder 1401 is a negative value, the first absolute-value converting unit 1403 converts the output data to a positive value having the equal absolute value and outputs the output data.

The output data of the first absolute-value converting unit 1403 is input to an inverting input terminal of a first comparator 1404. A first threshold 1405 is input to a non-inverting input terminal of the first comparator 1404. The first comparator 1404 compare the output data of the first absolute-value converting unit 1403 and the first threshold 1405 and outputs logic true when a value of the first adder 1401 is smaller than the first threshold 1405.

The negative remainder integrated value 1311 ($V_{OUT-}$) output by the integrating unit 1309 is input to a second adder 1406. The second adder 1406 outputs a value obtained by subtracting the positive remainder integrated value $V_{OUT-}$ from a $V_{OUT-}$ immediately preceding value 1407.

Output data of the second adder 1406 is input to a second absolute-value converting unit 1408. If the output data of the second adder 1406 is a positive value, the second absolute-value converting unit 1408 directly outputs the output data. If the output data of the second adder 1406 is a negative value, the second absolute-value converting unit 1408 converts the output data into a positive value having the equal absolute value and outputs the output data.

The output data of the second absolute-value converting unit 1408 is input to an inverting input terminal of a second comparator 1409. A second threshold 1410 is input to a non-inverting input terminal of the second comparator 1409. The second comparator 1409 compares the output data of the second absolute-value converting unit 1408 and the second threshold 1410 and outputs logical true when a value of the second adder 1406 is smaller than the second threshold 1410.

An output logical value of the first comparator 1404 and an output logical value of the second comparator 1409 are input to an AND gate 1411. The AND gate 1411 outputs logical true when the value of the first adder 1401 is smaller than the first threshold 1405 and the value of the second adder 1406 is smaller than the second threshold 1410.

Subsequently, as shown in FIG. 15, the determining unit 1313 shown in FIG. 13 verifies whether the value of the first adder 1401 is smaller than the first threshold 1405 and the value of the second adder 1406 is smaller than the second threshold 1410 (S1506).

That is, if the value of the first adder 1401 is equal to or larger than the first threshold 1405 or the value of the second adder 1406 is equal to or larger than the second threshold 1410 (NO in S1506), the determining unit 1313 substitutes the positive remainder integrated value 1311 ($V_{OUT+}$) in the $V_{OUT+}$ immediately preceding value 1402, substitutes the negative remainder integrated value 1312 ($V_{OUT-}$) in the $V_{OUT-}$ immediately preceding value 1407, and thereafter gives a start trigger to a normalization operation unit 1314.

Subsequently, as shown in FIG. 15, the normalization operation unit 1314 shown in FIG. 13 calculates a normalized positive remainder sensitivity function 1315 and a normalized negative remainder sensitivity function 1315 according to Expression 15 and Expression 16 (S1507).

[Math 11]

$$\overline{\Phi_{OUT+}}(x, y) = \frac{\Phi_{OUT+}(x, y)}{V_{OUT+}} \quad \text{(Expression 15)}$$

$$\overline{\Phi_{OUT-}}(x, y) = \frac{\Phi_{OUT-}(x, y)}{V_{OUT-}} \quad \text{(Expression 16)}$$

That is, the normalization operation unit 1314 receives the start trigger of the determining unit 1313 and divides the positive remainder sensitivity function table 1307 ($\Phi_{OUT+}$) by the positive remainder integrated value 1311 ($V_{OUT+}$) to calculate a normalized positive remainder sensitivity function 1315 ($\overline{\Phi_{OUT+}}$).

Similarly, the normalization operation unit 1314 divides the negative remainder sensitivity function table 1308 ($\Phi_{OUT-}$) by the negative remainder integrated value 1312 ($V_{OUT-}$) to calculate a normalized negative remainder sensitivity function 1316 ($\overline{\Phi_{OUT-}}$).

Subsequently, as shown in FIG. 15, a seed-vector operation unit 1317 calculates Expression 17 and Expression 18 to thereby calculate a positive remainder seed vector 1318 ($v_+$) and a negative remainder seed vector ($v_-$) shown in FIG. 13 (S1507).

[Math 12]

$$v_{+i} = \Sigma \overline{\Phi_{OUT+}}(x,y) G(x,y) \quad \text{(Expression 17)}$$

$$v_{-i} = \Sigma \overline{\Phi_{OUT-}}(x,y) G(x,y) \quad \text{(Expression 18)}$$

As indicated by Expression 17, the seed-vector operation unit 1317 calculates the positive remainder seed vector 1318 ($v_+$) using the normalized positive remainder sensitivity function 1315 ($\overline{\Phi_{OUT+}}(x,y)$) and the measured antenna sensitivity distribution function table 1101 (G) applied with coordinate conversion processing through a coordinate-conversion processing unit 1324.

As indicated by Expression 18, the seed-vector operation unit 1317 calculates the negative remainder seed vector 1318 ($v_-$) using the normalized negative remainder sensitivity function 1316 ($\overline{\Phi_{OUT-}}(x,y)$) and the measured antenna sensitivity distribution function table 1101 (G) applied with the coordinate conversion processing through the coordinate-conversion processing unit 1324.

The explanation is continued referring back to FIG. 15. Subsequently, the weighted-vector operation unit 1301 calculates a positive remainder weighted vector 1320 (b) and a negative remainder weighted vector 1321 (c) according to Expression 19 and Expression 20 (S1509).

[Math 13]

$$b = R^{-1}\left[v_+ + \left(\frac{1 - u^T V^{-1} v_+}{u^T V^{-1} u}\right) u\right] \quad \text{(Expression 19)}$$

$$c = R^{-1}\left[v_- + \left(\frac{1 - u^T V^{-1} v_-}{u^T V^{-1} u}\right) u\right] \quad \text{(Expression 20)}$$

where, $$\sum_{j=0}^{N_+ - 1} b_j = 1 \quad \text{(Expression 21)}$$

$$\sum_{k=0}^{N_- - 1} c_k = 1 \quad \text{(Expression 22)}$$

That is, the weighted-vector operation unit 1301 shown in FIG. 13 calculates the positive remainder weighted vector 1320 (b) with the BG method as in step S1504 using the inverse matrix table 1104 ($R^{-1}$) (a leader line P1331 in FIG. 13), the positive remainder seed vector 1318 ($v_+$), and the integrated value vector 1302 (u) (a leader line P1332 in FIG. 13).

The weighted-vector operation unit 1301 calculates the negative remainder weighted vector 1321 (c) with the BG method as in step S1504 using the inverse matrix table 1104 ($R^{-1}$) (the leader line P1331 in FIG. 13), the negative remainder seed vector 1319 ($v_-$), and the integrated value vector 1302 (u) (the leader line P1332 in FIG. 13).

Subsequently, a corrected-weighted-vector operation unit 1322 calculates, using Expression 23, a corrected weighted vector 1323 (a') using the corrected true value integrated value 1310 ($V_{IN}$), the positive remainder integrated value 1311 ($V_{OUT+}$), the negative remainder integrated value 1312 ($V_{OUT-}$), a, b, and c and overwrites the weighted vector 1303 (a) with the corrected weighted vector 1323 (a') (S1510).

[Math 14]

$$a'_m = \frac{a_m - V_{OUT+} b_m - V_{OUT-} c_m}{V_{IN}} \quad \text{(Expression 23)}$$

Note that Expression 23 is derived by expressions described below.

First, Expression 24 is derived by Expression 1, Expression 11, Expression 12, Expression 13, and Expression 14.

[Math 15]

$$\iint_s \Phi(x,y) dx dy = \iint_s \Sigma_{i\times 0}^{N-1} a_i G_i(x,y) dx dy = V_{IN} + V_{OUT+} + V_{OUT-} = 1 \quad \text{(Expression 12)}$$

Next, Expression 25 and Expression 26 described below are derived by Expression 15 and Expression 16.

[Math 16]

$$\iint_s \overline{\Phi_{OUT+}}(x,y) dx dy = 1 \quad \text{(Expression 25)}$$

$$\iint_s \overline{\Phi_{OUT-}}(x,y) dx dy = 1 \quad \text{(Expression 26)}$$

Next, Expression 27 and Expression 28 described below are derived from Expression 21 and Expression 22.

[Math 17]

$$\iint_s \Sigma_{j=G}^{N+-1} h_j G_j(x,y) dxdy = 1 \quad \text{(Expression 27)}$$

$$\iint_s \Sigma_{k=G}^{N--1} c_k G_k(x,y) dxdy = 1 \quad \text{(Expression 28)}$$

Next, both sides of Expression 27 are multiplied by the positive remainder integrated value 1311 ($V_{OUT+}$) and both sides of Expression 28 are multiplied by the negative remainder integrated value 1312 ($V_{OUT-}$). When these expressions are substituted in Expression 24 and deformed, Expression 29 described below is obtained.

[Math 18]

$$\iint_s (\Sigma_{i=0}^{N-1} a_i G_i(x,y) - V_{OUT+} \times \Sigma_{j=0}^{N+-1} b_j G_j(x,y) - V_{OUT-} \times \Sigma_{k=0}^{N--1} c_k G_k(x,y)) dxdy = V_{IN} \quad \text{(Expression 29)}$$

Further, when both sides of Expression 29 is divided by the corrected true value integrated value 1310 ($V_{IN}$), Expression 30 described below is obtained. Expression 23 is derived from Expression 30.

[Math 19]

$$\int \int_S \sum_{i=0}^{M-1} \frac{a_i - V_{OUT+} b_i - V_{OUT-} c_i}{V_{IN}} G_i(x, y) dxdy = 1 \quad \text{(Expression 30)}$$

When the calculation in step S1510 ends, the processing from step S1503 is repeated.

If both the values are smaller than the thresholds in step S1506 (YES in S1506), the determining unit 1313 outputs the weighted vector 1303 (a) at this point in time (S1511) and ends a series of processing (S1512).

An important point of the arithmetic processing for the weighted vector according to the present invention explained with reference to FIGS. 13, 14, and 15 above resides in, in step S1504, dividing the error components into the positive component and the negative component and extracting the error components from the corrected sensitivity function Φ(x,y), calculating the weighting tables for the respective error components, and performing the correction operation of the original weighting table. This arithmetic processing is repeated, whereby the error components decrease and finally converge into a predetermined value.

The weighted vector 1303 (a) explained above is a weighted vector at certain one point in an observation space. Therefore, the arithmetic operation is executed on the entire range in which optimization by the weighted vector effectively functions among measurement points observable by the artificial satellite 102.

The arithmetic operation of the weighted vector 1303 (a) requires a matrix operation of an enormous number of floating points. However, the weighted vector 1303 (a) once derived is invariable. Accordingly, after the weighted vector 1303 (a) is derived, optimized observation data can be instantaneously obtained by executing the arithmetic operation using the weighted vector 1303 (a) on the measurement data received from the artificial satellite 102.

Note that, since the directivity of the antenna changes, the calculation of the weighted vector 1303 (a) needs to be performed based on the measured antenna sensitivity distribution function table 1101 (G) according to a frequency band of the measurement data.

[Measurement Data Processing Device 101: A Simulation Operation Result]

FIGS. 16A to 16F are pseudo color graphs showing gains of the antenna on the xy plane obtained by performing a simulation operation for explaining effects of the present invention. However, the figures are shown in black and white because the figures cannot be represented in color in a patent specification.

Figures 16A, 16B:
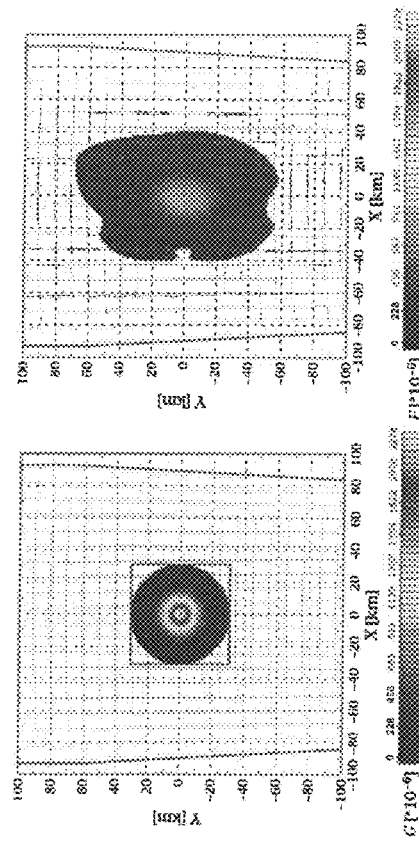
FIGS. 16A to 16F are pseudo color graphs showing gains of an antenna on an xy plane obtained by performing a simulation operation for explaining effects of the present invention, the figures being shown in black and white because the figures cannot be represented in color in a patent specification.

FIG. 16A is a pseudo color graph in which the target antenna sensitivity distribution function table 1102 (F) is developed on the xy plane.

FIG. 16B is a pseudo color graph in which a measured antenna sensitivity distribution function table 1101 ($G_0$) having a gain center coordinate equal to gain center coordinate of the target antenna sensitivity distribution function table 1102 (F) is developed on the xy plane.

Figures 16C, 16D:
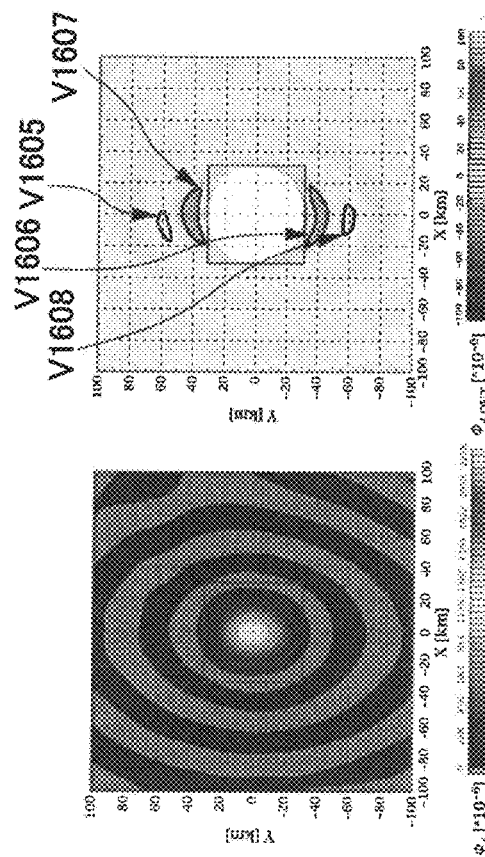

FIG. 16C is a pseudo color graph in which the corrected antenna sensitivity distribution function table 1106 (Φ) in a state in which the weighting coefficient optimization processing in the present invention is not applied is developed on the xy plane.

FIG. 16D is a pseudo color graph in which error components of the corrected antenna sensitivity distribution function table 1106 (Φ) shown in FIG. 16C are developed on the xy plane.

Figures 16E, 16F:
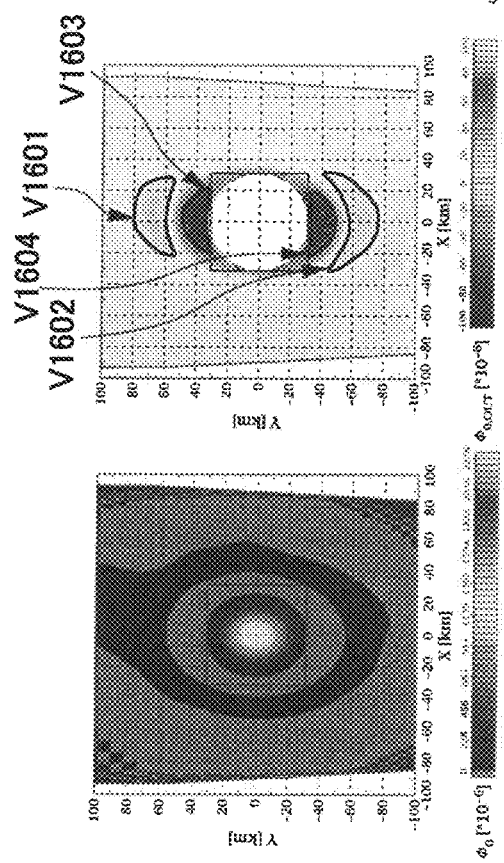

FIG. 16E is a pseudo color graph in which the corrected antenna sensitivity distribution function table 1106 (Φ) in a state in which the weighting coefficient optimization processing in the present invention is applied is developed on the xy plane.

FIG. 16F is a pseudo color graph in which the error component of the corrected antenna sensitivity distribution function table 1106 (Φ) shown in FIG. 16E are developed on the xy plane.

In particular, when FIG. 16D and FIG. 16F are compared, positive gain regions (a region V1601 and a region V1602) and negative gain regions (a region V1603 and a region V1604) clearly appear in FIG. 16D. However, positive gain regions (a region V1605 and a region V1606) and negative gain regions (a region V1607 and a region V1608) are small and the absolute values of the gains are also small in FIG. 16F.

Figure 17:
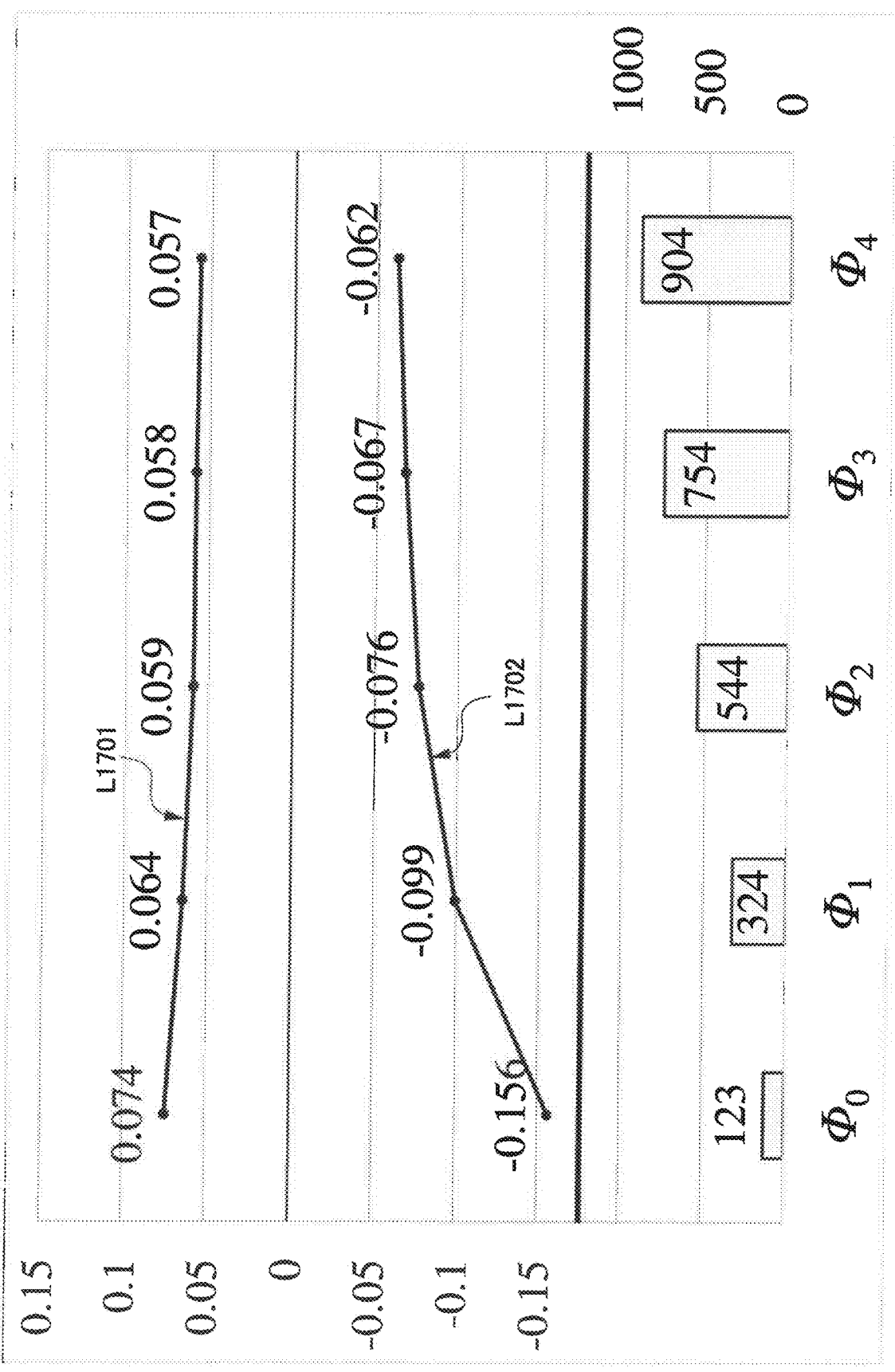
FIG. 17 is a graph showing fluctuation involved in arithmetic processing for a positive remainder integrated value $V_{out+}$ and a negative remainder integrated value $V_{out-}$.

FIG. 17 is a graph showing fluctuation involved in arithmetic processing for the positive remainder integrated value 1311 ($V_{OUT+}$) and the negative remainder integrated value 1312 ($V_{OUT-}$).

In FIG. 17, a value of the positive remainder integrated value 1311 ($V_{OUT+}$) is a line L1701, a value of the negative remainder integrated value 1312 ($V_{OUT-}$) is a line L1702, and a value of a bar graph represents the number of measured antenna sensitivity distribution function tables 1101 (G) added in repeated arithmetic processing.

Values of both of the positive remainder integrated value 1311 ($V_{OUT+}$) and the negative remainder integrated value 1312 ($V_{OUT-}$) gradually approach 0 according to the repetition of the arithmetic processing. However, a decrease width of the absolute values of the positive remainder integrated value 1311 ($V_{OUT+}$) and the negative remainder integrated value 1312 ($V_{OUT-}$) decreases every time the arithmetic processing is repeated. The decrease in the absolute values is hardly seen when the arithmetic processing is repeated approximately four times.

Figure 18A:
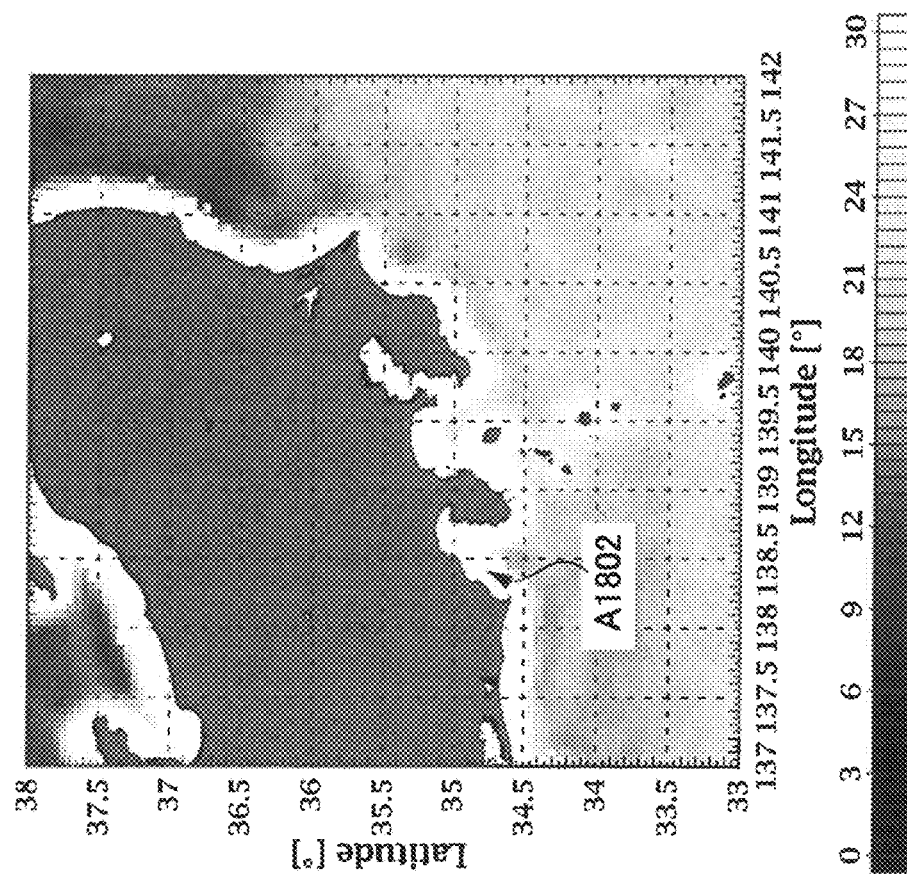
FIGS. 18A and 18B are diagrams showing results obtained by actually performing drawing processing based on data of the artificial satellite.
Figure 18B:
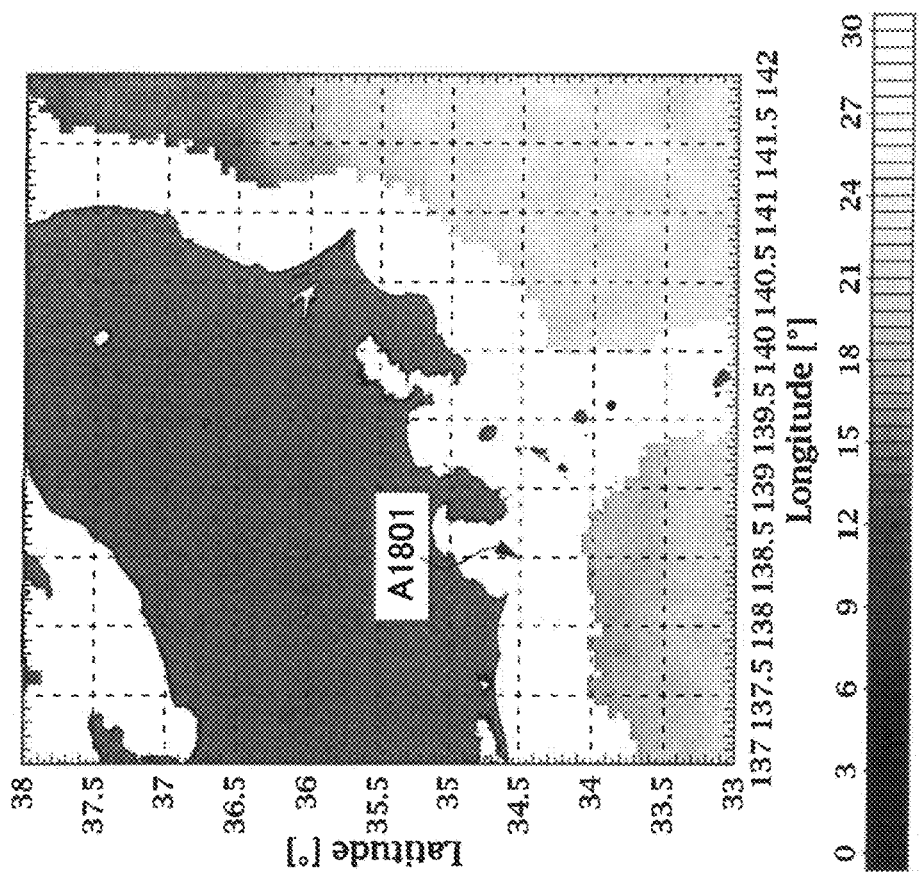

FIGS. 18A and 18B are diagrams showing results obtained by actually performing drawing processing based on data of the artificial satellite 102.

FIG. 18A is a sea surface temperature distribution chart drawn based on measurement data of the microwave radiometer before the application of the present invention.

FIG. 18B is a sea surface temperature distribution chart drawn based on measurement data of the microwave radiometer after the application of the present invention.

In FIG. 18A, since a land is included in an observation region, correct sea surface temperature (SST) cannot be calculated within 100 km from a coast (a coast region A1801).

In FIG. 18B, SST in 20 to 100 km from the coast can be calculated according to improvement of resolution (a coast region A1802).

The following modifications of the embodiment of the present invention explained above are possible.

(1) In the embodiment, the BG method is adopted as the weighted average operation for solving the inverse problem. However, a method other than the BG method may be adopted. For example, a Monte Carlo method can be used.

(2) In the embodiment explained above, the optimization of the measurement data in the microwave radiometer mounted on the artificial satellite 102 or the air plane is carried out. However, the present invention is also applicable to measurement data of a ground installed microwave radiometer.

In the embodiment of the present invention, the measurement data processing device 101 and the weighted vector optimization method are explained.

The measurement data processing device 101 according to the embodiment of the present invention is capable of improving resolution by multiplying a measurement data group of the microwave radiometer by the weighted vector and adding up the measurement data group. The weighted vector 1303 (a) solves the inverse problem based on the mathematical model for forming the sensitivity of the antenna as the Gaussian curved surface. The optimization is applied by repeatedly executing, outside the xy coordinate of the target antenna sensitivity distribution function table 1102 (F), the correction operation for minimizing the positive remainder sensitivity function table 1307 ($\Phi_{OUT+}$), which is data having a positive value, and minimizing the negative remainder sensitivity function table 1308 ($\Phi_{OUT-}$), which is data having a negative value.

The embodiment of the present invention is explained above. However, the present invention is not limited to the embodiment and includes other modifications and applications without departing from the gist of the present invention described in claims.

What is claimed is:

1. A system comprising:
an antenna having predetermined directivity;
a measurement data processing device that improves spatial resolution of measurement data, received from the antenna, involving two-dimensional coordinate information on a predetermined two-dimensional plane indicating signal intensity of a microwave received by a microwave radiometer from the two-dimensional plane using the antenna, the measurement data processing device comprising:
a plurality of multipliers that multiply together measurement values, which are the signal intensity of the microwave output by the microwave radiometer, and weighting coefficients to be an element of a weighted vector a and output multiplication results, and
an integrator that integrates the multiplication results of the plurality of multipliers, wherein
the weighted vector a has N elements, ai, where i ranges from 1 to N−1,
a sensitivity distribution of the antenna on the two-dimensional plane is represented as a measured antenna sensitivity distribution function G0(x,y) (where, x and y are coordinate information on the two-dimensional plane),
a sensitivity distribution of the antenna having a sensitivity center different from a sensitivity center of the measured antenna sensitivity distribution function G0(x,y) and crossing a sensitivity distribution on the two-dimensional plane of the measured antenna sensitivity distribution function G0(x,y) is represented as a measured antenna sensitivity distribution function Gi(x,y) (where, i=1 or more and N−1 or less, N is a natural number larger than 1),
a sensitivity distribution narrower than the sensitivity distribution on the two-dimensional plane of the measured antenna sensitivity distribution function G0(x,y) and having a sensitivity center equal to the sensitivity center of the measured antenna sensitivity distribution function G0(x,y) is represented as a target antenna sensitivity distribution function F(x,y), and
a sensitivity distribution obtained by multiplying together and integrating the measured antenna sensitivity distribution function Gi(x,y) and the weighted vector is represented as a corrected sensitivity function $\Phi$(x,y),
the weighted vector a is derived by performing arithmetic processing of an inverse problem of the measured antenna sensitivity distribution function G0(x,y) and the measured antenna sensitivity distribution function Gi(x,y), and the corrected sensitivity function $\Phi$(x,y), and
the weighted vector a improves accuracy of the corrected sensitivity function $\Phi$(x,y) with performance of the arithmetic processing of the inverse problem in order to reduce integrated values of a positive value region and a negative value region present on an outer side of the sensitivity distribution of the target antenna sensitivity distribution function F(x,y) in the corrected sensitivity function $\Phi$(x,y).

* * * * *